(12) United States Patent
Elhard et al.

(10) Patent No.: US 10,125,595 B2
(45) Date of Patent: Nov. 13, 2018

(54) DIELS-ALDER COUPLED PROPPANT BINDER RESINS

(71) Applicant: Battelle Memorial Institute, Columbus, OH (US)

(72) Inventors: Joel D. Elhard, Hilliard, OH (US); Phillip N. Denen, Reynoldsburg, OH (US); Robert S. Whitmore, Lexington, OH (US)

(73) Assignee: Battelle Memorial Institute, Columbus, OH (US)

( * ) Notice: Subject to any disclaimer, the term of this patent is extended or adjusted under 35 U.S.C. 154(b) by 34 days.

(21) Appl. No.: 15/242,597

(22) Filed: Aug. 21, 2016

(65) Prior Publication Data

US 2017/0051200 A1    Feb. 23, 2017

Related U.S. Application Data

(60) Provisional application No. 62/208,484, filed on Aug. 21, 2015.

(51) Int. Cl.
| | |
|---|---|
| *E21B 43/267* | (2006.01) |
| *E21B 43/04* | (2006.01) |
| *C09K 8/80* | (2006.01) |
| *C09K 8/56* | (2006.01) |

(52) U.S. Cl.
CPC ............ *E21B 43/267* (2013.01); *C09K 8/56* (2013.01); *C09K 8/805* (2013.01); *E21B 43/04* (2013.01)

(58) Field of Classification Search
None
See application file for complete search history.

(56) References Cited

U.S. PATENT DOCUMENTS

| | | |
|---|---|---|
| 3,929,191 A | 12/1975 | Graham et al. |
| 5,218,038 A | 6/1993 | Johnson |
| 6,997,259 B2 | 2/2006 | Nguyen |
| 7,021,379 B2 | 4/2006 | Nguyen |
| 7,135,231 B1 | 11/2006 | Sinclair et al. |
| 7,153,575 B2 | 12/2006 | Anderson et al. |
| 7,987,912 B2 | 8/2011 | Robinson et al. |
| 8,875,786 B2 | 11/2014 | Nguyen et al. |
| 9,359,547 B2 | 6/2016 | Ogle |
| 2007/0215354 A1* | 9/2007 | Rickman ............... C09K 8/64 166/295 |
| 2009/0126932 A1* | 5/2009 | Robinson ............ C08F 220/28 166/300 |
| 2014/0060828 A1 | 3/2014 | Nguyen |
| 2014/0311745 A1* | 10/2014 | Vo ..................... C09K 8/5755 166/307 |

* cited by examiner

*Primary Examiner* — Anuradha Ahuja
(74) *Attorney, Agent, or Firm* — Frank Rosenberg; C. Michael Gegenheimer

(57) ABSTRACT

Proppant particles may be coated with some particles coated with a diene and other proppant particles coated with a dienophile that would bind the particles through a Diels-Alder reaction. In some other embodiments, proppant particles may be coated with alternating layers of diene and dienophile that would react through a Diels-Alder reaction. The invention may be advantageous for forming underground structures useful in the extraction of hydrocarbons.

17 Claims, 9 Drawing Sheets

DIELS-ALDER COUPLED PROPPANT BINDER RESINS

RELATED APPLICATION

This application claims priority to U.S. provisional patent application Ser. No. 62/208,484, filed 21 Aug. 2015.

INTRODUCTION

The extraction of hydrocarbons from underground formations has great economic importance. As a result, extensive research has been devoted toward developing and improving techniques for extracting hydrocarbons. The inventions described in this disclosure provide improvements in the extraction of hydrocarbons that use water injection wells, especially the extraction of hydrocarbons from sub-sea level formations. They may also be used in any unconsolidated formation where sand control methods (such as Frac-packing) are needed to prevent passage of formation sand or produced sand and clay into the production zone where they can clog screens and reduce productivity.

Frac-packing (or Frac-n-Pak, or FnP) involves the simultaneous hydraulic fracturing of a reservoir and the placement of a gravel pack. The fracture is created using a high-viscosity fluid, which is pumped at above the fracturing pressure. Screens are in place at the time of pumping. The sand control gravel is placed outside the casing/screen annulus. The aim is to achieve a high-conductivity gravel pack, which is at a sufficient distance from the wellbore, and so create a conduit for the flow of reservoir fluids at lower pressures. The frac-pack technique combines the production improvement from hydraulic fracturing with the sand control provided by gravel packing.[1]

[1] Middle East & Asia Reservoir Review Number 8, 2007, p. 41

In sub-sea level formations with high permeability, a production well can be surrounded with one or more injection wells. Water is injected into the injection well(s) to maintain pressure in the reservoir rock as well as to sweep the hydrocarbons to the production well(s).

FIG. 1 illustrates the injection well with proppant placement. At a suitable depth in the well, one perforates the well casing, and then installs plumbing to deliver proppant and subsequently inject water into the well. After placing a screen, one then hydraulically creates a fractured zone in the formation, then pumps proppant material as a slurry to hold open the fracture after the proppant becomes immobile. One fills the void between the casing ID and the screen to maintain a path for fluid flow into the well. The proppant holds the formation open to maintain a fluid path for injected seawater to pass down while preventing formation material from entering the well bore by acting as a filter.

Much of the expense with water injection in sandy formations is involved with the logistics of timing of the Frac and Pack (FnP) sand control operations. Once the FnP filter-pack is injected, the rig must be dismantled; equipment must be removed from the well-bore and transported to the next water injection well, which can up to a week. Any sand control treatment that reacts and cures too rapidly at the down-hole temperatures of e.g. 160-200 F, can fuse well equipment in-place like cement. Therefore, an ideal sand-control system should have a latent cure or a controlled delay before curing begins which can be tuned to the down-hole temperature conditions. For example, develop minimal unconfined compressive strength (UCS) of <50 psi for 3-5 days so that rig equipment can be withdrawn easily and transported to the neighboring site.

Most conventional resin coated proppants (RCP) are coated with high temperature Phenol-formaldehyde Novolak resins, which have been pre-reacted to a very high melt viscosity, which can react with similar B-stage material on adjacent particles. However, it has been found that an external stress of ~2000 psi must be placed on the particle mass to get adequate bonding between particles. In the absence of this stress the hard particles do not bond, and are not useful in sand consolidation operations where lower stress is available. Ideally, RCP for sand control operations for water injection wells must also be able to cure under only atmospheric pressure range (~1G).

Current systems can be flushed out of the annulus and lost into the reservoir via the fracture as particles are carried away by high rate water injection. This means the system can no longer prevent formation material from entering the wellbore. Therefore, it is desirable to find solutions that prevent the proppant from being flushed away.

The invention described in this patent involves resin-coated proppants. Generally, resin coated proppants (RCP) are either precured or curable. Precured resin coated proppants comprise a proppant coated with a resin that has been significantly crosslinked. This precured resin coating provides crush resistance to the proppant. The resin coating is already cured before it is introduced into the well and therefore, the proppant does not agglomerate. However, in some instances, precured proppants may flow back from a propped fracture, especially during clean up or production in oil and gas wells, because they are mainly held in the fracture by stress. In contrast, curable resin coated proppants comprise a proppant coated with a resin which has not been significantly crosslinked before being placed in a subterranean formation. Curable resins include (i) resins that are cured entirely in the subterranean formation and (ii) resins that are partially cured prior to injection into the subterranean formation with the remainder of curing occurring in the subterranean formation. Curing occurs as a result of the crosslinking of the resin, due to either the stress and temperature conditions existing in the subterranean formation, and/or because of an activator and/or catalyst. The object is to cause the proppant to bond together, form a 3-dimensional matrix, and thereby prevent proppant flow-back. Most RCP are coated with high temperature Phenol-formaldehyde Novolak resins that have been pre-reacted to a very high melt viscosity but have residual functionality which can react with similar B-stage material on adjacent particles. However, it has been found that an external stress of ~1000-2000 psi must be placed on the particle mass to get adequate bonding between particles. In the absence of this stress the hard particles do not bond, and are not useful in sand consolidation operations where lower stress is available. This is illustrated in Table 1 from published data. In U.S. Pat. No. 5,218,038, the inventors stated that "relative low strength [is] obtained in the cured composition if cured without compression, but high compressive strengths if cured under pressure. This is important and valuable if the resin coating should accidentally be cured in the pipe or well hole before it reaches the subterranean formation where high pressures and temperatures are encountered. Prematurely cured compositions produced by the present invention can be flushed out of the pipe with water whereas conventional hexamethylenetetramine-cured novolaks cannot be flushed with water from the pipe or well hole."

TABLE 1

Unconfined Compressive Strength of Curable Resin Coated Proppant with and without 1000 psi closure stress[2]

| | API Mesh Size | | | |
|---|---|---|---|---|
| | 16/30 | 20/40 | 30/50 | 40/70 |
| Bulk Density (lb./cu.ft) | 94.3 | 94.9 | 94.9 | 93.01 |
| Specific Gravity | 2.56 | 2.55 | 2.55 | 2.5 |
| Unconfined Compressive Strength: | | | | |
| 228° F. and 1,000 psi closure (24 hours) | >600 psi | >600 psi | >650 psi | >660 psi |
| 228° F. and 0 psi closure (24 hours) | <5 psi | <5 psi | <5 psi | <5 psi |

[2]Atlas Curable Resin Coated Proppant (CRC-C) Technical Datasheet, Atlas Resin Coated Proppant LLC, Taylor Wisconsin.

Contrary to prior art efforts such as that described in the above table and in U.S. Pat. No. 5,218,038, we have sought, RCP for sand control operations for water injection wells that can able to cure under only atmospheric pressure range (~1G) and have a latent cure to prevent premature curing in the wellbore.

Some prior art references describe the use of "tackifying agents" or tackifiers blended with particulates on the fly and introduced down-hole (e.g. Nguyen et al U.S. Pat. No. 8,875,786 B2; and Robinson et al U.S. Pat. No. 7,987,912). As used herein "tackifying agent" refers to a non-hardening substance that has a nature such that it is (or may be activated to become) somewhat sticky to the touch. Tackifiers must remain sticky because their function is to trap fine particles that may be floating by or are generated by the crushing of an uncoated proppant particle. In the present invention, cured binder resin coated proppants (RCP) are used to eliminate the need for tackifying agents, since even if the RCP particle is compressed; it is not friable and will self-contain any fractured regions.

Since the present invention involves the use of the Diels-Alder reaction, a brief summary of some prior patents involving the Diels-Alder reaction are discussed here. Robinson et al. in U.S. Pat. No. 7,987,912 entitled Reversible Polymeric Gelation for Oilfield Applications describe using the Diels-Alder reaction to form a gel. The Diels-Alder reaction is used in the forward direction to increase viscosity at relatively low temperature and in the reverse direction to decrease viscosity at relatively high temperature. Robinson et al. also mentioned that "if the retro Diels-Alder temperature was very high, this fluid could be used as an impermeable filter cake/membrane which could be kept cool by mud circulation." One embodiment is mentioned in which a pre-polymer mixture that contains furan monomers having at least three furan moieties mixed with maleimide monomers that have at least three maleimide moieties. Although this patent primarily concerns the formation of a gel, the possibility of using the Diels-Alder reaction to control the tackiness of resin coated proppants is discussed at col. 22, lines 42-61.

Ogle et al. in WO/2014/120486 describe a wellbore servicing fluid comprising a coupling agent, a harden-able resin, a hardening agent and a proppant wherein the coupling agent comprises a multi-hydroxyl phenyl, a dihydroxyl phenyl, a trihydroxyl phenyl, ascorbic acid, a hydroxymethylphenol, a hydroxymethylnaphthol, an oxidation product thereof, a derivative thereof, or combinations thereof. The coupling agent, a resin, and a hardening agent are designated as a coupled resin composition (CRC). The CRC is used in combination with a proppant material to form a resin-coated proppant material that may be used to fracture a formation to enhance recovery of hydrocarbon. The coupling agent may undergo a cycloaddition reaction with one or more surfaces of the formation to covalently bond to the formation surface. Ogle et al. stated that cycloaddition reactions to the formation surface that may be suitably employed in the methods disclosed herein include Diels-Alder reaction, [4+2] cycloaddition reactions, [3+2] cycloaddition reactions, [2+2] cycloaddition reactions, and the like."

Ogle et al describe a process to attach materials to the formation surface; while the present invention utilizes resin binder coated (RCP) particles introduced into the formation to bind with each other. Although we do not intend to limit the scope of the invention to any theory, it is believed that there is no direct bonding of the articles of the present invention with the formation surface, only with other such proppant particles, e.g., where particles having one coating type bind to particles of another coating type. It is believed that the binding to the formation surface of the cured proppant pack may be only physical in nature.

Nguyen et al. in U.S. Published Patent Application 2014/0060828 entitled Methods for Hindering Settling of Proppant Aggregates in Subterranean Operations described a method of fracturing a subterranean formation by providing proppant aggregates themselves comprising proppant particles coated with a binding fluid and having foamed particulates adhered thereto; and placing the proppant aggregates suspended in gelled treatment fluid into at least a portion of the fracture so as to form a proppant pack therein. Nguyen et al. mention a lengthy list of optional resins.

One of the distinguishing characteristics of the products of this invention is that once introduced down-hole in a high viscosity gel, they can cure in-place without the requirement to completely flush or "break" the gel surrounding them. This is in contrast to the prior art such as described in Johnson et. al U.S. Pat. No. 5,218,038 incorporated herein for reference: "Furthermore, if the fracturing fluid gel does not break and allow the curable resin-coated proppants to come together before the resin cures, they cannot bond together forming a three dimensional matrix. If they do not bond together, flowback may occur." [col. 1 line 35-44] In addition, the reference describes the conventional rationale for requiring high compressive stress on curable RCP to initiate cure: "It is desirable that a proppant has low compressive strength at atmospheric pressure and possesses high compressive strength under load . . . " (typically ~1000 psi). "If a proppant is not correctly placed in well fractures and experiences no stress during cure, the improperly placed proppant of the present invention can be removed easily. [col. 11 line 64-68, col. 12 line 1]. By contrast, the present invention requires no external stress to cure and yet can be removed easily from well components using the latent cure imparted by the technology.

SUMMARY OF THE INVENTION

In a first aspect, the invention provides a method of binding proppants in an underground formation, comprising: delivering a slurry comprising a first resin coated proppant and a second resin coated proppant through a wellbore; contacting the first coated proppant with a second coated proppant in an underground formation at a temperature sufficient to cause a resin coating on the first coated proppant to react with a resin coating on the second coated proppant in a Diels Alder reaction; wherein a reactive component in the resin coating on the first coated proppant consists essentially of one or more dienes and wherein a reactive component in the resin coating on the second coated proppant consists essentially of one or more dienophiles. In the context of this invention, that a coating "consists essentially of" means that it excludes other components that would substantially affect the performance of the coating. For example, a resin coating wherein a reactive component "consists essentially of" a diene means that the coating does not contain reactive dienophiles since this would result in premature coupling of the dienes.

Various preferred embodiments of the invention possess one or any combination selected from the following: the temperature is at least 160° F., or from 160 to 250° F., or from 180 to 230° F., or from 190 to 220° F.; the temperature is naturally occurring temperature in the downhole environment (alternatively, the temperature could be modified to a desired temperature range for the Diels Alder reaction); the slurry comprises HEC gel or crosslinked Guar gel; wherein, prior to delivering the slurry through a wellbore, the first and/or second resin coated proppant comprises a water-soluble release coating; wherein the ratio of the first coated proppant particles to the second coated proppant particles is from 10:1 to 1:10, more preferably in the range 2:1 to 1:2, and most preferably within 10% of a 1:1 ratio by number of particles of each (in some embodiments, these ratios correspond to mass or volume in place of number); wherein, prior to delivery in a slurry, and not including any release coating (if present), the resin coating on the first resin coated particle has a thickness in the range of 10 μm to 200 μm, in some embodiments in the range of 20 μm to 150 μm, in some embodiments in the range of 50 μm to 120 μm; wherein, prior to delivery in a slurry, and not including any release coating (if present), the resin coating on the second resin coated particle has a thickness in the range of 10 μm to 200 μm, in some embodiments in the range of 20 μm to 150 μm, in some embodiments in the range of 50 μm to 120 μm; or wherein the dienes comprise a furfuryl moiety and the dienophiles comprise a maleimide moiety.

In some preferred embodiments of the invention, the dienes and/or dienophiles are selected from the following:

proppant particles comprise a reactive component in the coating consisting essentially of one or more dienes; and wherein the second type of resin coated proppant particles comprise a reactive component in the coating consisting essentially of one or more dienophiles. In some embodiments, the proppant particles are crosslinked via a bicyclic ring linkage.

In another aspect, the invention provides a proppant network structure kit, comprising: a first container comprising a first resin coated proppant wherein a reactive component in the coating on the first resin coated proppant consists essentially of one or more dienes; and a second container comprising a second resin coated proppant wherein a reactive component in the resin coating on the second resin coated proppant consists essentially of one or more dienophiles. In some preferred embodiments, the first and/or second resin coated proppant particles comprise a water-soluble release coating.

In a further aspect, the invention provides a slurry comprising a first resin coated proppant, a second resin coated proppant, and a carrier fluid; wherein a reactive component in the coating on the first resin coated proppant consists essentially of one or more dienes; and wherein a reactive component in the coating on the second resin coated proppant consists essentially of one or more dienophiles.

In another aspect, the invention provides a method of extracting hydrocarbons from an underground formation, comprising: forming at least one production well; optionally, forming at least one water injection well in proximity to the at least one production well; injecting the slurry (mentioned above) through a wellbore and into the underground formation; wherein the proppants in the slurry react via a Diels Alder reaction to form a cross-linked, porous and immobilized proppant network in the area around the wellbore; injecting water into the underground formation; and withdrawing hydrocarbons through the production well. In some embodiments, the method comprises forming at least one water injection well in proximity to the at least one production well; and passing water through the wellbore of the

| Representative classes of dienes and dieneophiles, for the purposes of this invention include: | |
|---|---|
| Dienes (Part A) | Dieneophiles (Part B) |
| 1,3-Butadiene; 1,3-Pentadiene; 2,4-Hexadiene; 1,3-cyclohexadiene; and their derivatives | Heterocyclic compounds such as Benzoxazole derivatives |
| Furfuryl compounds and their derivatives | Maleic Anhydride and Maleimide Derivatives |
| Anthracene compounds and their derivatives | C-vinyllic, O-vinyllic, N-vinyllic compounds |
| α-β-Unsaturated Carbonyl Compounds such as aldehydes, ketones, o-Methide quinones, as well as, o-Quinones, 1,2-Diketones and derivatives | —C≡N Imino Derivatives, —C≡N Cyanogen -like compounds, Carbonyl and thiocarbonyl compounds, Nitroso compounds, N-Sulfinyl Compounds, Azo (—N═N—) Dicarboxylate Derivatives |
| Dienes containing two nitrogen atoms in the conjugated system: pyrazole derivatives, imidazole derivatives, quinoxalines. | Trivalent Phosphorous Compounds like phosphonites, trialkyl phosphites. |

This can be also be conducted on an unconsolidated, subsided or eroding formation in which the resulting network is stronger and denser than for water injection usage.

Another aspect of the invention provides an underground, porous, proppant network, comprising: resin coated proppant particles that are connected to each other via covalent bonds comprising a cyclic or bicyclic 6-membered carbon ring comprising at least one double bond; wherein the resin coated proppant particles comprise a first type of resin coated proppant particles and a second type of resin coated proppant particles, wherein the first type of resin coated water injection well. In some embodiments, water is passed through the wellbore of the production well prior to the step of withdrawing hydrocarbons through the production well.

In another aspect, the invention provides a method of binding proppants in an underground formation, comprising: making a slurry of a coated proppant having a multilayer structure; wherein the multilayer structure comprises a proppant particle at the core and at least one first coating layer and at least one second coating layer; wherein a reactive component in the first coating layer consists essentially of one or more dienes and wherein a reactive component in the second coating layer consists essentially of one or more dienophiles; forcing a slurry comprising a coated proppant through a wellbore into an underground formation; wherein the temperature in the underground formation is sufficient to cause dienes in the first coating layer to react with dienophiles in the second coating layer via the Diels Alder reaction.

In a further aspect, the invention provides a resin coated proppant composition, comprising first resin coated proppant particles and second resin coated proppant particles; wherein the first resin coated proppant particles comprise an outermost reactive layer consisting essentially of a resin modified with a furfuryl moiety; wherein the second resin coated proppant particles comprise an outermost reactive layer consisting essentially of a resin modified with a maleimide moiety. In some preferred embodiments, the first and/or second resin coated proppant particles comprise a water-soluble release coating.

All of the inventive aspects mentioned above utilize the Diels Alder reaction:

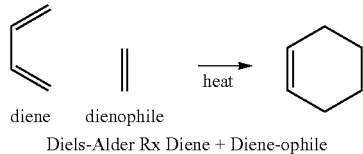

diene    dienophile

Diels-Alder Rx Diene + Diene-ophile

Diels-Alder

Another invention disclosed herein is a method for producing resin coated proppants, comprising: adding to a container a particulate such as sand or inorganic or sand; adding to the container a resin that has a melt or softening temperature in the range of about 60-120° C.; mixing the particulate and the resin in a high speed, multiaxial centrifugal planetary mixer; wherein there is no mixing blade interaction with the mixture, only resin-particle and particle-particle interaction in the container. This method is not limited to the Diels Alder reaction, although the use of a resin or resins suitable for the Diels Alder reaction is a preferred embodiment. In some preferred embodiments, the resin and particulate rotate in the high speed, multiaxial centrifugal planetary mixer with G force of 100-400G. In some preferred embodiments, the resin and particulate rotate in the high speed, multiaxial centrifugal planetary mixer at a speed of at least 1200 rpm, or in the range of 1300 to 1800 rpm, or about 1500 rpm.

The invention may, in some preferred aspects, be characterized by any combination of steps and/or features that are described in the Detailed Description or Examples. The invention also can be characterized by any of the test conditions and/or physical characteristics mentioned in the Examples but within a scope of ±30%, ±20%, or ±10% of the values shown in the examples. In this regard, the invention can, in some embodiments, be characterized in terms of values selected from the graphs over any selected range (for example, a selected temperature range or time range) including the entire reported range or any selected subset of the reported range.

The present invention, in various embodiments, may provide advantages such as one or more of the following: resistance to degradation; the ability to cure well in the sustained presence of either linear hydroxyethyl cellulose (HEC) or crosslinked guar gel systems; relative insensitivity to pH conditions especially the high pH (~10-11) needed for borate crosslinking of guar; a reservoir of unreacted moieties within the proppant coatings to provide additional bonding potential and enhanced durability; the ability to form a porous proppant network that remains unclogged for the life of the producing well (preferably in the range of 10-20 years); and/or the ability to remain stable at (down-hole) temperatures the range of 160-200° F. (70-93° C.) or higher.

Glossary

"Diene," in the context of the present invention refers to conjugated dienes (C=C—C=C) the 4-electron component that are able to react with a dienophile, the 2-electron component to form a six-membered ring (typically a cyclohexene) via the Diels-Alder reaction. The diene can be open chain or cyclic and must be either in the cis configuration or able to convert to the cis configuration.

A "dienophile" is a moiety comprising a double bond, the 2-electron component, that reacts with a diene, the 4-electron component to form a six-membered ring (a cyclohexene in the typical case of a C=C dienophile) via the Diels-Alder reaction. This is distinct from any other type of cyclic ring formation of a diene.

A "proppant" refers to a particle such as sand or a man-made particle that is sufficiently insoluble under conditions underground to resist disintegration. Because the proppants can be used to form a porous network around a wellbore; and are not necessarily required to prop open fractures in an underground formation, they need not have the hardness required of conventional proppants. Essentially, the proppants of the present invention can be any particle that can carry a resin coating and resist disintegration under conditions present in the vicinity of a water injection or production wellbore.

A "resin" is an organic substance that is solid or highly viscous at temperatures up to at least 50 C so that resin-coated particles are free-flowing at ambient conditions. In some preferred embodiments, "resin" refers to any of numerous polymerized synthetics or chemically modified natural resins including thermoplastic materials and thermosetting materials; and, as with all preferred embodiments, any of the aspects of this invention may, in selected cases, be described in conjunction with the preferred embodiments.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of." As used in this specification, the terms "includes" or "including" should not be read as limiting the invention but rather, listing exemplary components.

If there is any conflict in the usages of a word or term in this specification and one or more patent or other documents mentioned herein, the definitions that are consistent with this specification should be adopted for the purposes of understanding this invention.

DETAILED DESCRIPTION OF THE INVENTION

Figure 1:
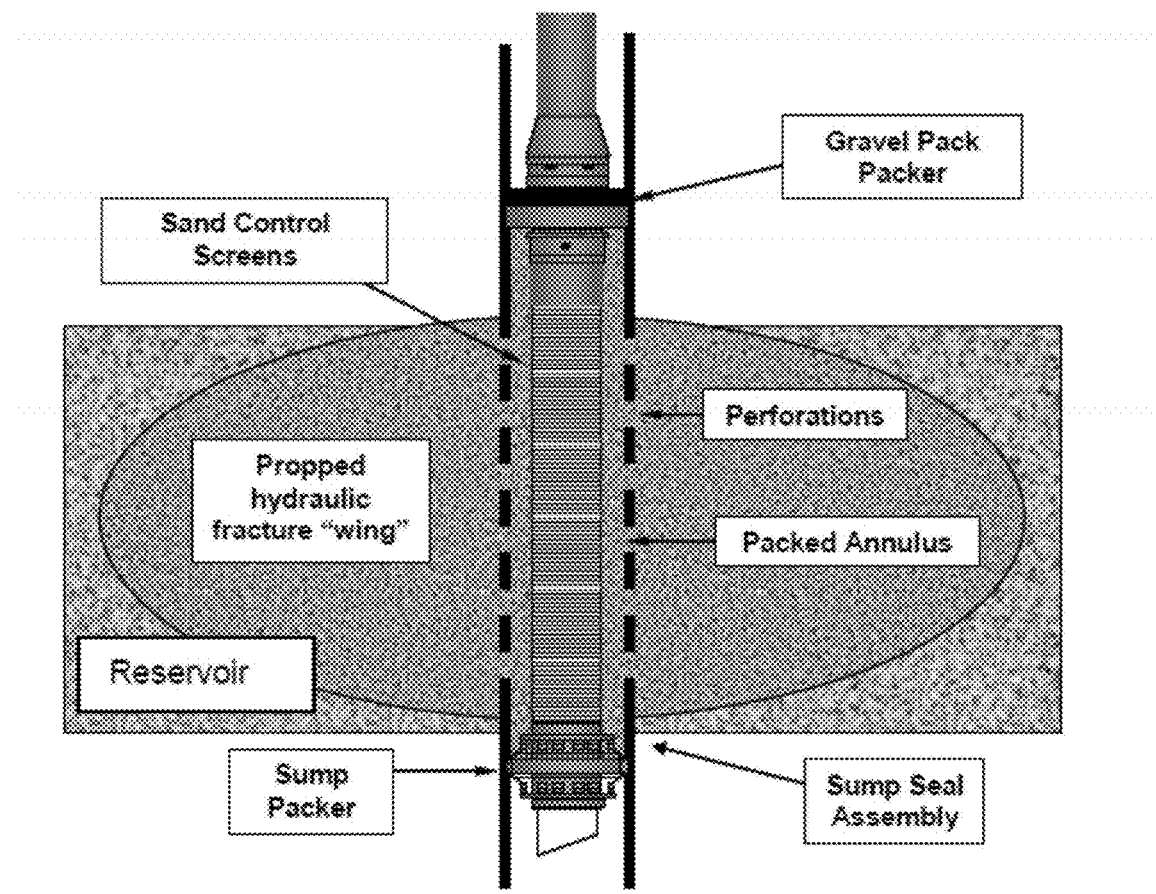
FIG. 1 is a schematic illustration of a sand control proppant placement. As with other schematic illustrations, it is not drawn to scale.

Traditional processes to produce resin-coated proppants are described in Graham et al. (U.S. Pat. No. 3,929,191) and are incorporated herein by reference. The particulate material may be coated by dissolving powdered resin in a suitable solvent, mixing the resulting solution with the particles, and finally evaporating the solvent. The final product is a composite material consisting of a substrate and an encapsulating coating of a solid resin. This particulate material is characterized as free flowing and can be stored for relatively long periods of time at surface temperatures without appreciable agglomeration. A hot coating process may also be used. This technique involves preheating the particles, slowly adding a fusible resin to the substrate; mixing the substrate and the resin until the resin melts and completely coats the individual particles; and finally cooling the coated particles to return the resin to the solid state.

Traditionally, coating procedures are carried out in very large (e.g., 20,000 lb.) batch kettles. In the case where very hard e.g. ceramic beads are the proppants to be coated, they can cause scratching and damage to steel reactor kettle walls, stirrers and conveyors. A preferred method used in the current invention is a particularly novel one involving no direct contact of the proppant beads with anything other than themselves and the polymeric container (e.g. HDPE, PP, Teflon, etc.) in which they are mixed.

For the purposes of the present disclosure, the term proppant will be used to refer to any particulate solid material, which is stable at the conditions that will be encountered in the producing formations over a long period of time. Specifically, it is preferred that the granular material be hard, rigid, generally spheroidal particles of material which are substantially inert to crude oil, natural gas, water, brine and other fluids naturally present in subterranean formations and producing wells, as well as to fluids commonly injected into subterranean petroleum formations for the purpose of stimulating oil production.

Particulate substrates, or proppants, also termed "particles" herein, suitable for use with the present invention can be selected from any propping agent suitable for hydraulic fracturing known in the art. Examples include, but are not limited to, natural materials, silica proppants, ceramic proppants, metallic proppants, synthetic organic proppants, sintered bauxite, and combinations thereof.

Natural products suitable for use as particulates in the present disclosure include, but are not limited to, nut shells such as walnut shells, brazil nut shells, and macadamia nut shells, as well as fruit pits such as peach pits, apricot pits, olive pits, and any resin impregnated or resin coated version of these.

Silica particles suitable for use with the present invention include, but are not limited to, glass spheres and glass microspheres, glass beads, silica quartz sand, silicon carbide, and sands of all types such as white or brown. Typical silica sands suitable for use include Ottawa, Jordan, Brady, Hickory, Ariz., and Chelford, as well as any resin coated version of these sands. Other suitable proppants include a variety of naturally occurring minerals and their oxides. Such compounds include alumina, cordierite, gilsonite, mullite, calcium oxide, and zirconium oxide. Ceramic proppants suitable for use with the methods of the present invention include, but are not limited to, ceramic beads, ceramic oxides, ultra-lightweight porous ceramics, economy lightweight ceramics such as "EconoProp®" or "ValuProp®" (Carbo Ceramics, Inc.), lightweight ceramics such as "CarboLite®" or "Naplite®" (Carbo Ceramics, Inc.), intermediate strength ceramics such as "CarboProp® 40 ('' (Carbo Ceramics Inc.) or "Interprop®" (Norton Proppants), and high strength ceramics such as "CarboHSP®" (Carbo Ceramics, Inc.), "Sintered Bauxite™" (Norton Proppants), "SinterLite", "SinterbalFM" (Sintex Minerals & Services, Inc.), or "Versaprop" (Norton Proppants) as well as any resin coated or resin impregnated versions of these.

Metallic particles suitable for use with the embodiments of the present invention include, but are not limited to, aluminum shot, aluminum pellets, iron shot, steel shot, and the like, as well as any resin coated versions of these metallic proppants.

Synthetic particles are also suitable for use with the present invention. Examples of suitable synthetic particles include, but are not limited to, plastic particles or beads, nylon beads, nylon pellets, SDVB beads, and resin agglomerate particles similar to "FlexSand MS", as well as resin-coated versions thereof.

As a practical matter, naturally occurring particulate materials such as small pebbles, gravel or sand are often used. The particle size distribution is not critical and any size proppant can be used. The preferred proppant has a predominant portion of its particle size in the range of 20 mesh to 40 mesh, or 16 mesh to 30 mesh, with the actual distribution further restricted based on the well to be treated. Suitable mesh sizes (U.S. Sieve Series) for use with the present invention include 8/12, 8/14, 8/16, 12/18, 12/20, 16/20, 16/30, 20/40, 30/50, and 40/70. Generally, the 20/40 mesh proppant comprises the majority of the product used. However, both larger and smaller grain proppants are required for different types and depths of wells." See Sinclair et al. U.S. Pat. No. 7,135,231 is incorporated herein by reference as if reproduced in full below.

The preferred proportions of the two component (A:B) RCP are preferably in the range from 10:1 to 1:10, more preferably in the range 2:1 to 1:2, and most preferably within 10% of a 1:1 ratio by number of particles of each (in some embodiments, these ratios correspond to mass or volume in place of number).

The preferred coating thickness on the RCP is a function of the individual resin component density as well as the desired performance properties for the proppant pack. For example a nominal 3 wt. % Part A RCP may have a coating thickness of ~100 μm on a 16/20 mesh proppant (~850 μm-~1180 μm) compared with ~170 μm for a nominal 5 wt. % loading. With the thicker coating, it has been observed that a higher UCS strength and hydraulic flow stability can be obtained. However, the larger diameter RCP for the 5 wt. % loading also lowers the free porosity between particles and lowers the permeability (or production for oil and gas removal) or increases the backpressure for water injection well applications. We have found that a balance of strength and permeability can be achieved based on the formation requirements. In some embodiments, the uncoated proppants have a mesh size in the range of 20 to 40, more preferably, in the range of 16 to 30. In some embodiments, the coated proppants have a mesh size in the range of 18 to 30, more preferably, in the range of 18 to 35. In other embodiments, the coated proppants have a mesh size in the range of 14 to 20, more preferably, in the range of 16 to 25. The resin thickness is preferably in the range of 10 μm to 200 μm, in some embodiments in the range of 20 μm to 150 μm, in some embodiments in the range of 50 μm to 120 μm.

Some embodiments of the invention are based on binding proppant particles together using a multi-component (Part A, Part B) multi-bead approach based on a Furfuryl Maleimide Diels-Alder (FMDA) resin cured proppant pack. The proppant particles are coated with either furfuryl (A) or maleimide (B) functional polymers that have high melting points near the activation temperature (~160-200° F.) of the downhole environment. At lower temperatures, these proppant coatings are solid. Due to the limited molecular mobility of the solid chemical components, part A and part B proppants can be mixed together without extensive D-A coupling reaction taking place. Once the proppant pack temperature increases, the resin begins to crosslink and the network is formed.

Typically, the binder system shows very little cure during the period of time 1-3 days, following injection, while the formation temperature rises back to ~160-200° F., but develops a strong porous network over the next several days. Once cured, the filter-pack can withstand a large water injection flux, e.g. >300 gallon/min through a ~8-inch diameter pipe casing across a 1-inch thick section for the lifetime of the injection well at low backpressure (e.g. 30-40 psi). In laboratory tests, typical pipe diameters may be ~2 inches in diameter and an equivalent water flow of ~20 gallon/minute can be used.

Typically, the binder system cures without external pressure at 1G, and can be formulated and delivered in either an HEC or crosslinked guar slurry and cures and provides the same strength in either. This is in contrast to conventional epoxy or novolak binders that do not cure as well, if at all, in crosslinked guar. The Diels-Alder binder cures in the presence of any carrier fluid liquid, for example, under both KCl brine-washed and where HEC gel or crosslinked Guar gel is left surrounding the proppant mass.

Diels-Alder Binder System: Furfuryl Maleimide Diels-Alder

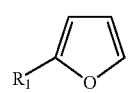

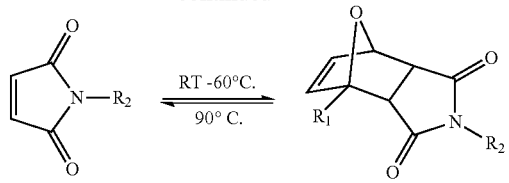

In the reaction above, R1 and R2 can be H or any carbon-containing moiety. Diels-Alder reactions such as with a diene (e.g. -furfuryl) which will be referred to as Part A by convention in this disclosure, and a dieneophile (e.g., -maleimide) which will be referred to as Part B in this disclosure is described as a reversible reaction with a reversion temperature of ~90° C.[3]. Surprisingly, we have found that this reaction can successfully be used to make strong bonding systems for resin-coated proppants, with the mechanical properties of the fully reacted binder being maintained to at least 225° C.

[3] Peterson A. M.; Palmese G. R.; Kinetic and thermodynamic aspects of thermoreversibly cross-linked polymer networks. Macromol. Chem. and Phys. 2013, 214, 1798-1805.

The Diels Alder cycloaddition reaction is a "concerted" reaction, with no chemical intermediates and involves no net chemical functional group reaction. The uncoupling reaction, which is called a retro-Diels-Alder reaction, is reported to occur >90° C., and if so, would self-heal at lower temperatures. Since the proppant pack will be immobile at the end of the FnP packing step at elevated down-hole temperature, and cools afterward, this should not result in proppant loss. We have found that exposure at temperatures >113° C. does not result in any change in binder performance.

Binder System #1 (FM1) Technology Description

Figure 2:
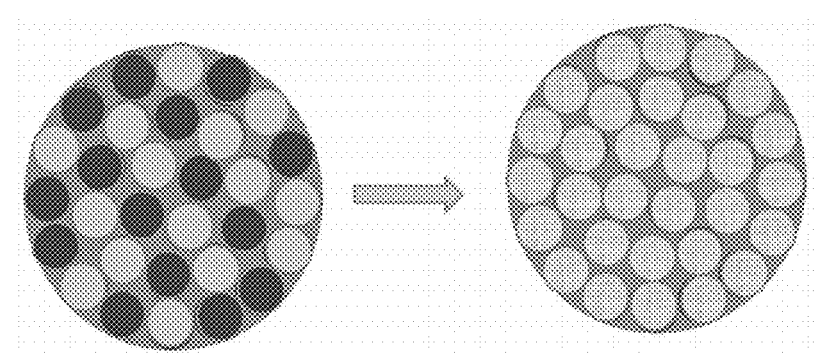
FIG. 2 is a schematic illustration of a 2-bead binder coated proppant system.

The technology system has been designed based on treating each coated bead as a separate reactant with each bead of a first type adjoining a plurality of beds of a second type, for example, a bead of a first type having up to six nearest-neighbor contacting co-reactants. In preferred embodiments, the chosen mixing ratio of part A and part B coated proppants in this technology in a ratio of about 1:1 based on weight. As long as the Part A, Part B beads are mixed thoroughly prior to cure, the 3-D interpenetrating network can provide its maximum strength. Although short-range ordered structures are possible, typically the proppants form a network without long-range order. A depiction of the 2-bead system is shown in FIG. 2.

System 1: Part A (Furfuryl)+Part B (Maleimide)→FMDA linked system

Diels-Alder Binder System: Examples of Formulations

A preferred binder formulation is based on a Part A prepared through furfuryl functionalization of a bisphenol-A epichlorohydrin base polymer (e.g. DER 663U) and is shown below. The Battelle FM1 RCP Binder Resin Component A (f = 2), Furfuryl-Amine-Adduct of DER 663U (Dow)

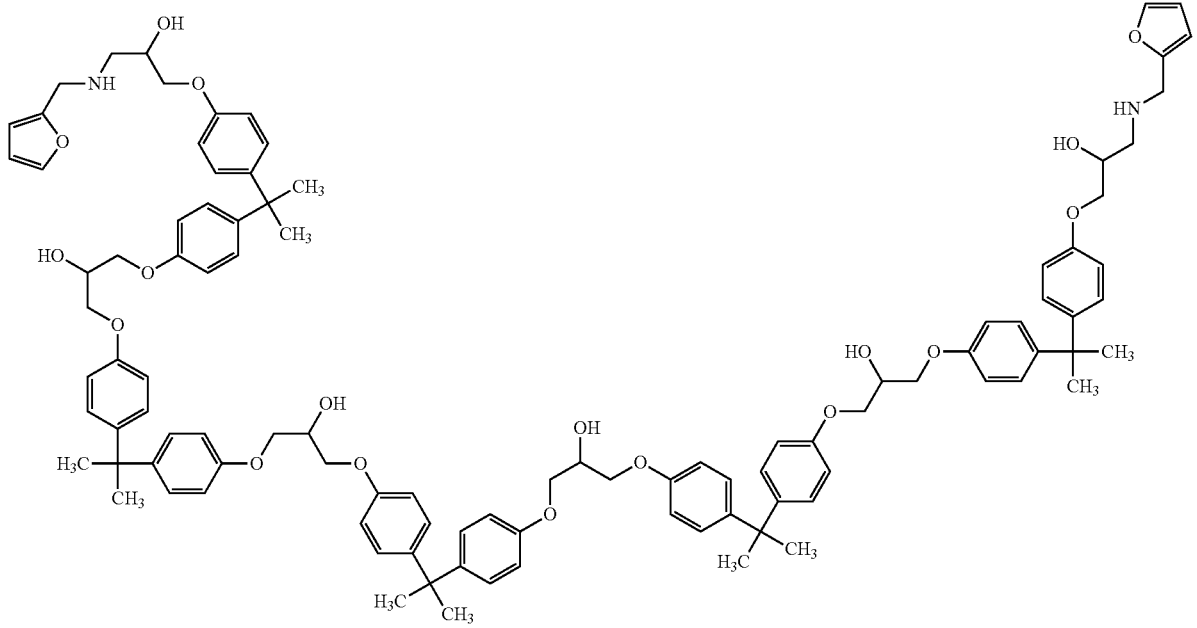

Battelle FM1 RCP Resin Component A,
Furfuryl-Amine-Adduct of DER 663U (Dow)

| | |
|---|---|
| Molecular Formula | = $C_{103}H_{118}N_2O_{18}$ |
| Formula Weight | = 1672.04162 |
| Molar Refractivity | = 476.66 ± 0.3 cm$^3$ |
| Molar Volume | = 1396.3 ± 3.0 cm$^3$ |
| Parachor | = 3677.6 ± 4.0 cm$^3$ |
| Index of Refraction | = 1.598 ± 0.02 |
| Surface Tension | = 48.1 ± 3.0 dyne/cm |
| Density | = 1.197 ± 0.06 g/cm$^3$ |
| Polarizability | = 188.96 ± 0.5 $10^{-24}$ cm$^3$ | corresponding preferred Part B component is prepared through oligomerization of a hydrogenated C36 Dimer acid such as Empol 1008 or 1012 (BASF) with Pyromellitic Diimide followed by end capping to produce a bismaleimide and is available from Designer Molecules, Inc as BMI-3000, the structure of which is shown below.

Battelle's FM1 RCP Binder, Component B, BisMaleimide (f = 2) (BMI-3000®, Designer Molecules Inc.)

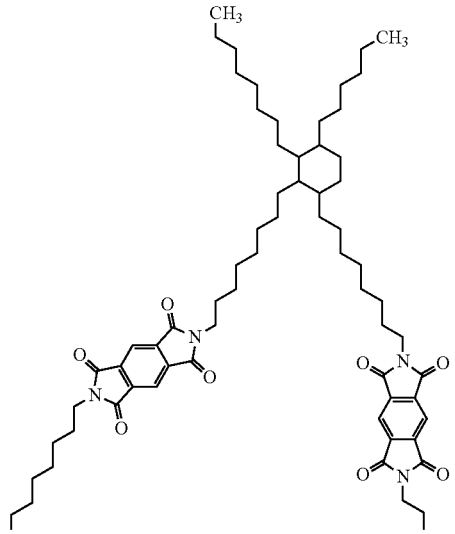

-continued

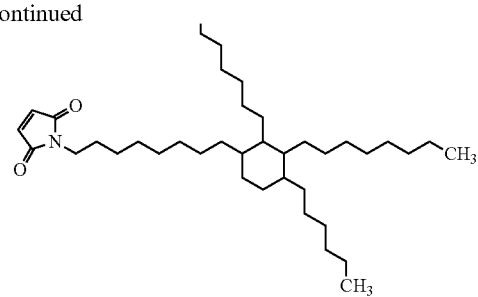
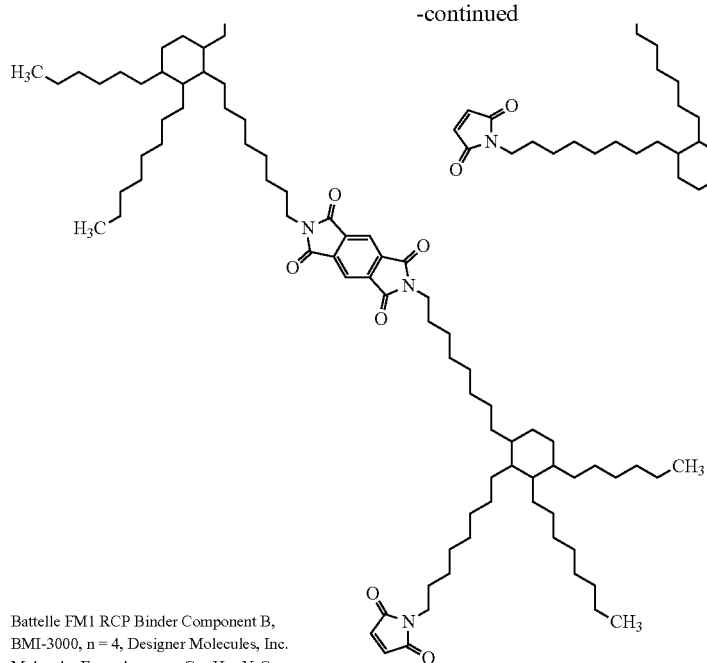

Battelle FM1 RCP Binder Component B,
BMI-3000, n = 4, Designer Molecules, Inc.
Molecular Formula = $C_{182}H_{290}N_8O_{16}$
Formula Weight = 2846.294
Molar Refractivity = 842.55 ± 0.3 cm$^3$
Molar Volume = 2767.0 ± 3.0 cm$^3$
Parachor = 6989.3 ± 6.0 cm$^3$
Index of Refraction = 1.520 ± 0.02
Surface Tension = 40.7 ± 3.0 dyne/cm
Density = 1.028 ± 0.06 g/cm$^3$
Polarizability = 334.01 ± 0.5 10$^{-24}$ cm$^3$ Other preferred Part A components useful in this invention were prepared through furfuryl functionalization of Novolak and Cresol polymer backbones using Epon 154 and Epon 164 and are depicted below. Experimental test data using all three Part A systems is presented in the examples section.

Battelle RCP Binder Resin Noyolak-Furfuryl-Amine Adduct of Epon 154 (Hexion) (n = 3.6)

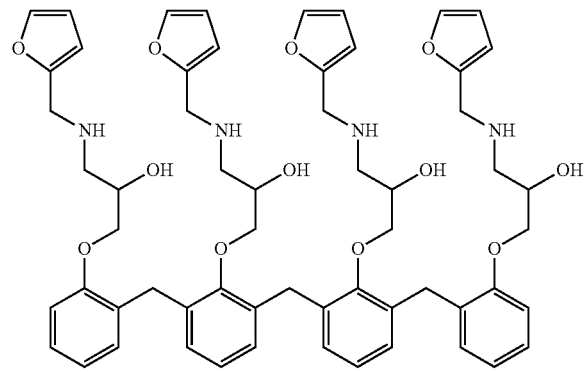

Battelle Epon 154 Novolak-FA Resin Component A (n = 3.6)
Molecular Formula = $C_{59}H_{68}N_4O_{12}$
Formula Weight = 1025.19082
Molar Refractivity = 284.00 ± 0.3 cm$^3$
Molar Volume = 822.5 ± 3.0 cm$^3$
Parachor = 2217.3 ± 4.0 cm$^3$
Index of Refraction = 1.606 ± 0.02
Surface Tension = 52.8 ± 3.0 dyne/cm
Density = 1.246 ± 0.06 g/cm$^3$
Polarizability = 112.58 ± 0.5 10$^{-24}$ cm$^3$ -continued Battelle RCP Binder Resin Cresol-Furfuryl-Amine Adduct of Epon 164 (Hexion), (n = 4.1)

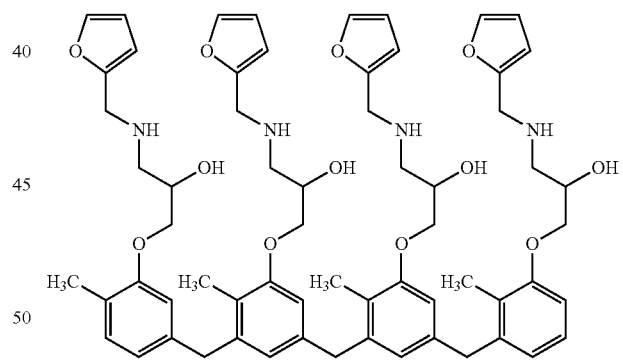

Battelle Epon 164 Cresol-FA Resin Component A
Molecular Formula = $C_{63}H_{76}N_4O_{12}$
Formula Weight = 1081.29714
Molar Refractivity = 303.30 ± 0.3 cm$^3$
Molar Volume = 887.6 ± 3.0 cm$^3$
Parachor = 2367.8 ± 4.0 cm$^3$
Index of Refraction = 1.599 ± 0.02
Surface Tension = 50.6 ± 3.0 dyne/cm
Density = 1.218 ± 0.06 g/cm$^3$
Polarizability = 120.24 ± 0.5 10$^{-24}$ cm$^3$ In some preferred embodiments, a furfuryl-coated resin is formed by reacting a furfuryl-containing moiety with an epoxy resin. For example, in a preferred embodiment designated as FM1, furfuryl amine, is used to produce a furfuryl functional Part A through reaction of the amine groups with the epoxy terminal groups of e.g. DER 663U, the resulting product (shown above) coated beads of which is reacted with the Part B Bismaleimide (shown above) coated beads in the Diels-Alder reaction down-hole.

Figure 3:
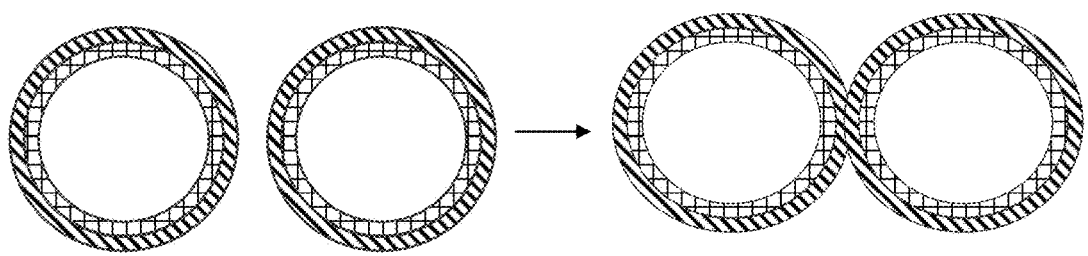
FIG. 3. is a schematic illustration of two layer proppant coated beads fusing outer layers to form A-B-A binder Rx, where A is indicated by the square-patterned layer and B indicated by the layer marked with diagonal lines.

A multilayer bead coating can be envisioned that comprises either a diene outer reactive layer or a dieneophile outer reactive layer, with the other component residing in an adjacent internal layer. While not being bound by theory, it is believed that the nature of the high molecular weight solid-phase coating layers is such that they do not mix well with each other, but react at contact points between them. When the multilayer-coated beads come in contact and the down-hole temperature warms to the softening point of the component layers, they begin to fuse together, forming essentially a three-layer core-A-B-A-core arrangement (FIG. 3). Then, as the Diels-Alder reaction between the components in the layers occurs, the overall binding strength of the system becomes dependent on the sum of the individual interfacial bonds e.g. adhesive between core and component A and core and component B, cohesive between component A and Component B with the corresponding shear strength of the Diels-Alder reaction product bridging the whole network together at the points of direct contact and load.

It has been shown that the Diels-Alder cycloaddition reaction is "concerted", i.e. there are no intermediates formed during the reaction and it behaves as a "click" reaction (much like a mousetrap). This may help explain the minimal impact expected for exposure of the cured network to elevated temperature, above the reported retro-DA onset threshold of ~90° C. There need not be complete diffusion of Part A, or even much mixing of A and B into a homogeneous phase. Instead, the two layers of B interact, where B is a high molecular weight solid, and the D-A cure is between the A-B layers on the individual beads, "at the interface" between A and B layers and may not extend through the entire A-B-B-A. B-B fuse together as a melt of the same component and behave as a single layer of B, interposed between and bonded to A layers that (in a proppant-A-B system) are adjacent to the proppant surface.

Once the pack cools, we still have the picture as shown above, not a single mixed or blended phase of A-B. The interface bonding is also about binding to the surface of the proppant (for example, aluminosilicate) bead. A good coating of A on e.g. CarboProp® and B on CarboProp® at moderate temperature and high shear can be obtained because of the good interfacial interaction between the components and the inorganic surface. Once coated with A or B it may difficult to coat the second organic component over the first; however, a coating aid such as a thin layer of mineral oil or low melting wax can be placed intervening A and B.

The coating on a proppant should be solid to prevent wash-off during slurry, delivery and flushing. Also, in the case of proppants that have A and B components on the same particle, prior to downhole delivery, the A and B components should not be in a homogeneous mixture and should not be in a dispersed phase A-B mixture (that is, a resin layer having droplets of A dispersed in a B layer (or vice versa) should be avoided). The temperature at which two solid components can mix well together may depend on the melting points of each component. Consider, for example, a case in which the melting point of component A is ~92 C, which is ~200 F, at the upper end of our downhole curing temperature tests (and ~DA reaction onset). Without the application of shear at high temperature, the components will not mix, and since the required temperature is greater than the Diels Alder reaction temperature, they will react even before they completely mix. Once the proppant particles have been mixed into carrier fluid and delivered down-hole, there is no more shear between particles, just "static" 1G contact.

Figure 4:
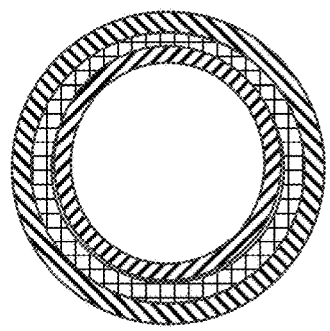
FIG. 4 is a schematic illustration of a resin binder coated proppant bead with outermost water-soluble protective coating layer applied, illustrated for a two-component layered system.

An alternative form of a multilayer bead system has been produced for the subject invention in which the outer layer is not reactive, but instead serves as a protective coating for the dry proppant-resin composition (FIG. 4). For example, a protective coating release layer may comprise one or more of any one of several PVP or HMC base water-soluble "immediate release" coatings such as Kollicoat IR® (BASF), OPAdry® (ColorCon Inc.). The protective coating release layer may serve to enhance particle flow, reduce dusting potential, improve storage stability in elevated temperature/humid environment, and prevent reaction between particles during storage, for example, in a single bag particle mixture, as well as during handling e.g., pneumatic air-line dry transfer to/from barges, storage containers or oil-rigs.

The protective coating dissolves when submerged in water for a period of time and the resulting proppants with exposed reactive coatings can then react as described above. The result is the same binding strength with a modest increase in cure-time.

A large number of corresponding diene and dieneophile functional binder systems can be envisioned. Examples of suitable dienes and dienophiles are well known and are described in references such as Hamer, "1, 4-cycloaddition reactions: The Diels-Alder reaction in heterocyclic syntheses" (Organic chemistry; a series of monographs; Vol. 8), 1967, and are disclosed herein by reference. Systems capable of 1,4-Cycloaddition Diels Alder reaction as binder components include both 5-membered and 6-membered heterocyclic systems. See Table 2.

TABLE 2

Representative classes of dienes and dieneophiles, for the purposes of this invention

| Dienes (Part A) | Dieneophiles (Part B) |
| --- | --- |
| 1,3-Butadiene; 1,3-Pentadiene; 2,4-Hexadiene; 1,3-cyclohexadiene; and their derivatives | Heterocyclic compounds such as Benzoxazole derivatives |
| Furfuryl compounds and their derivatives | Maleic Anhydride and Maleimide Derivatives |
| Anthracene compounds and their derivatives | C-vinyllic, O-vinyllic, N-vinyllic compounds |
| α-β-Unsaturated Carbonyl Compounds such as aldehydes, ketones, o-Methide quinones, as well as, o-Quinones, 1,2-Diketones and derivatives | —C≡N Imino Derivatives, —C≡N Cyanogen -like compounds, Carbonyl and thiocarbonyl compounds, Nitroso compounds, N-Sulfinyl Compounds, Azo (—N═N—) Dicarboxylate Derivatives |

TABLE 2-continued

Representative classes of dienes and dieneophiles, for the purposes of this invention

| Dienes (Part A) | Dieneophiles (Part B) |
|---|---|
| Dienes containing two nitrogen atoms in the conjugated system: pyrazole derivatives, imidazole derivatives, quinoxalines | Trivalent Phosphorous Compounds like phosphonites, trialkyl phosphites |

Binder component functionality for this application was analyzed using Frontier Molecular Orbital (FMO) theory and electronic structure modeling techniques. "The FMO theory states that a reaction between two compounds is controlled by the efficiency with which the molecular orbitals of the individual reaction partners interact. The interaction is most efficient for those orbitals that overlap best and are closest in energy; the reactivity is completely determined by interactions of the electrons that are highest in energy of one of the reaction partners (i.e. those in the Highest Occupied Molecular Orbital, the HOMO) with the Lowest Unoccupied Molecular Orbital (LUMO) of the other partner.

Applied to the Diels-Alder reaction in the normal electron demand case, the reaction is controlled by the interaction of the HOMO of the diene and the LUMO of the dienophile . . . reduction of the diene-HOMO dienophile-LUMO energy gap can be realized by either raising the energy of the HOMO of the diene by introducing electron donating substituents or lowering the energy of the dienophile-LUMO by the introduction of electron withdrawing substituents"[4]

[4] Big Chemical Encyclopedia; Chemical substances, components, reactions, process design; http://chempedia.info/info/135488/

Calculated Examples

Molecular Orbital (Diene $E_{HOMO}$, Dieneophile $E_{LUMO}$) Characterization of Additional Binder Component Formulations The best performing experimental formulation for the present invention was one in which a fufuryl functional diene component (Part A) was coated on one bead and a maleimide functional dieneophile (Part B) was coated on the second bead used in the formulation. In order to characterize the potential utility of other candidate binder component functional linking groups molecular structures of candidate dienes and dieneophiles were drawn and subjected to Ab-initio Hartree-Fock (631G**) geometry optimization and molecular orbital energy calculations. The energy and symmetry of the highest occupied molecular orbital (HOMO) of the Diene components was determined for each as in the normal electron demand case. Similarly, the energy and symmetry of the lowest occupied molecular orbital (LUMO) was determined. Shown in the Table 3 and 4 below are representative results. The cyclopentadienyl-functional (comp#2), Benzofuran-functional (comp#3), and Indene-functional (comp#4), and Indene-functional (cmp4), all had higher energy HOMO when compared to the standard furfuryl system showing they would be likely to readily react to form good binder systems.

TABLE 3

Diene Linking Groups Analyzed using Computational Chemistry

| Compound # | Name | Higher E HOMO: Diene is favorable | E Homo (kJ/mole) | ΔE Homo (kJ/mole) | Structure |
|---|---|---|---|---|---|
| 1 | furaMeAmPr 1-[(furan-2-ylmethyl)amino]propan-2-ol | Diene (Furfuryl) (STANDARD) | (−)803.3 | Std. = 0 | |
| 2 | CPDMeAmPr 1-[(cyclopenta-1,3-dien-1-ylmethyl)amino]propan-2-ol | Diene (CPDiene) | (−)767.3 | +36.0 (higher E Homo: favorable) | |
| 3 | BenzofuranMAP BenzofuranMAP 1-[(2-benzofuran-1-ylmethyl)amino]propan-2-ol | Diene | (−)676.9 | +126.4 (higher E Homo: favorable) | |

TABLE 3-continued

Diene Linking Groups Analyzed using Computational Chemistry

| Compound # | Name | Higher E HOMO: Diene is favorable | E Homo (kJ/mole) | ΔE Homo (kJ/mole) | Structure |
|---|---|---|---|---|---|
| 4 | IndeneMAP 1-[(2H-inden-1-ylmethyl)amino]propan-2-ol | Diene | (−)654.9 | +148.4 (higher E HOMO: favorable) | |

The dieneophile LUMO energy calculations (Table 4) showed that the cyclopentadienyl-functional binder (comp#6) would not be as good a candidate as the standard maleimide. However, the remaining candidates: the N-phenyl maleimide functional (comp#7), the Bisbiphenyl Bis-maleimide (comp#8), the m-Phenyl-bismaleimide (comp#9), as well as the Naphthoquinone functional (comp#10) and Benzoquinone functional (comp#11) were all shown to be good candidates for Part B binder components.

TABLE 4

Diene-ophile Linking Groups Analyzed using Computational Chemistry

| Compound # | Name | Lower E LUMO Dieneophile is favorable | E Lumo (kJ/mole) | ΔE Lumo (kJ/mole) | Structure |
|---|---|---|---|---|---|
| 5 | nPrMalemide [21746-40-7] | Diene-Ophile (Maleimide) (STANDARD) | (+)118.2 | Std = 0 | |
| 6 | nPrCpdione {2-propylcyclopent-4-ene-1,3-dione} | Diene-Ophile (CPdione) | (+)143.2 | +25.0 (higher E LUMO: not as favorable) | |
| 7 | N-phenylmaleimide [941-69-5] | Diene-Ophile (Maleimide) | (+)95.0 | (−)23.2 (lower E LUMO: favorable) | |
| 8 | BisphenylBismaleimide [13676-54-5] | Diene-Ophile (Maleimide) | (+)100.9 | (−)17.3 (lower E LUMO: favorable) | |
| 9 | Mphenylbismaleimide [3006-93-7] | Diene-Ophile (Maleimide) | (+)103.3 | (−)14.9 (lower E. LUMO: favorable) | |

TABLE 4-continued

Diene-ophile Linking Groups Analyzed using Computational Chemistry

| Compound # | Name | Lower E LUMO Dieneophile is favorable | E Lumo (kJ/mole) | ΔE Lumo (kJ/mole) | Structure |
|---|---|---|---|---|---|
| 10 | 6HyMeNaphthoquinone [81402-06-4] | Diene-Ophile (Quinone) | (+)50.0 | (−)68.2 kJ (lower E LUMO, favorable) | |
| 11 | 2HyMeBenzoquinone [644-17-7] | Diene-Ophile (Quinone) | (+)55.5 | (−)62.7 (lower E LUMO, favorable) | |

Components for this invention can include those that are mono-functional in diene or dieneophile functionality, e.g. CAS number [1032997-24-2] and [1032997-17-3], respectively as shown in the Table 5 below, provided that the overall component provides sufficient molecular weight for structural properties, adhesion to or covalent reaction with substrate, and provides free reactive functionality for the final DA binder reaction.

Preferred resins useful for this invention are those that are multi-functional, with at least two linking groups per resin component, and can be the reaction product of a base oligomer or polymer and diene or dieneophile pendant linking groups through non-Diels Alder grafting reactions that preserve the DA functionality. See Table 5 for examples. More preferred component resins of this invention include those that are solid or semi-solid at ambient temperature, with molecular weight sufficient to impart the shear modulus and binder strength needed for this application.

TABLE 5

Examples of suitable Binder Components.

| [CAS] | Diels-Alder Part A: "Diene" Candidate Structures |
|---|---|
| 1327278-54-5 Type: furfuryl (tetra-) | |

TABLE 5-continued
Examples of suitable Binder Components.
| | |
|---|---|
| 1357144-49-0<br>Type:<br>anthracene<br>(tetra-) | 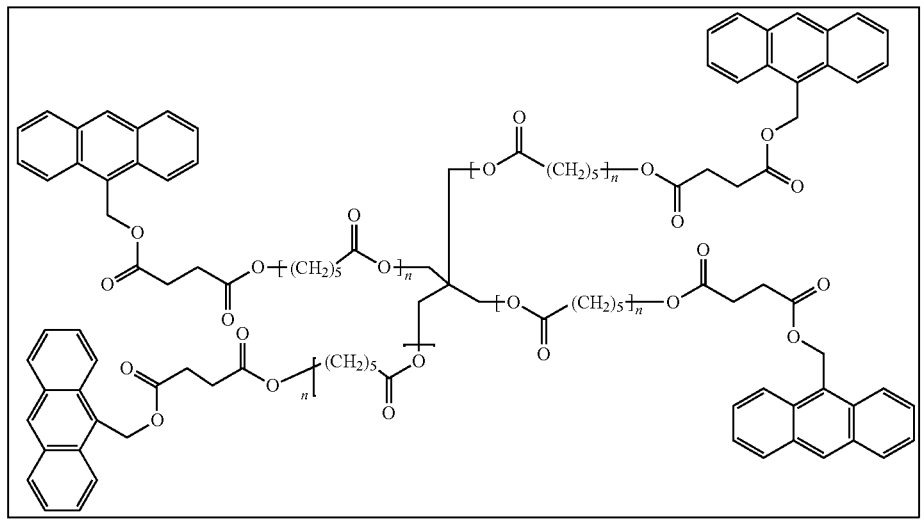 |
| 1357144-48-9<br>Type:<br>furfuryl<br>(di-) | 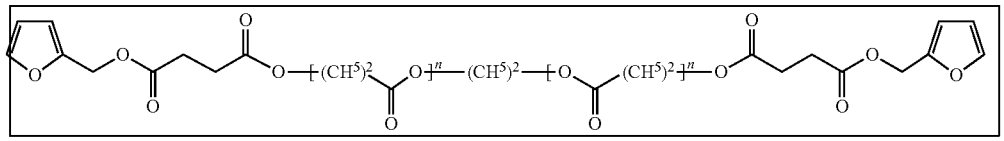 |
| 668994-09-0; or<br>Linking Group<br>Type:<br>anthracene | 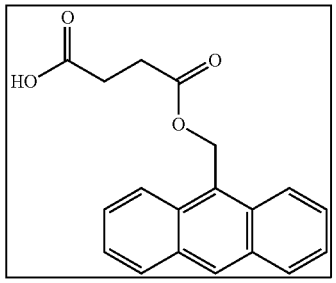 [SMILES: O=C(O)CCC(=O)OCc1c2ccccc2cc2ccccc12] |
| 98-00-0;<br>98-01-1;<br>or<br>Linking Group<br><br>Type:<br>furfuryl | 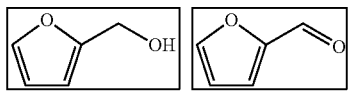 |
| 3454-28-2;<br>polymers or<br>copolymers<br>Type:<br>furfuryl | 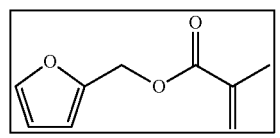 |

TABLE 5-continued
Examples of suitable Binder Components.
| | |
|---|---|
| 1032997-20-8<br>type:<br>furfuryl<br>(mono-) | 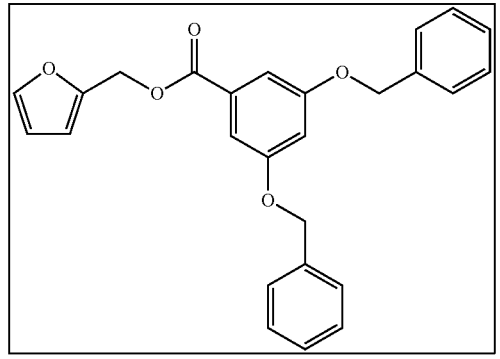 [SMILES: O=C(OCc1ccco1)c1cc(OCc2ccccc2)cc(OCc2ccccc2)c1] |
| Stage 2:<br>[1032997-24-2]<br>Type:<br>furfuryl<br>(mono-) | 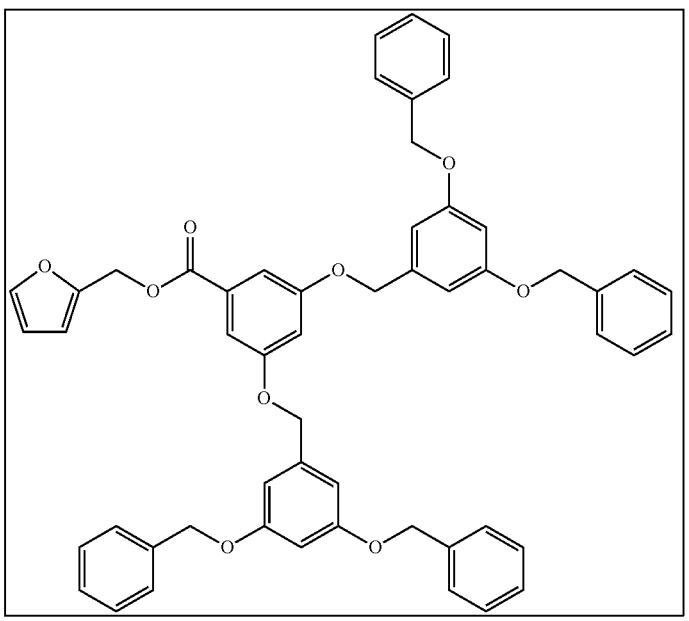 [SMILES: O=C(OCc1ccco1)c1cc(OCc2cc(OCc3ccccc3)cc(OCc3ccccc3)c2)cc(OCc2cc(OCc3ccccc3)cc(OCc3ccccc3)c2)c1] |
| [61190-77-0]<br>furfuryl<br>(di-) | 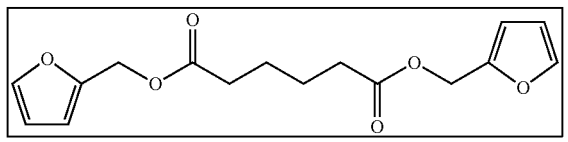 [SMILES: O=C(CCCCC(=O)OCc1ccco1)OCc1ccco1] |
| [135726-87-3]<br>furfuryl<br>(tri-) | 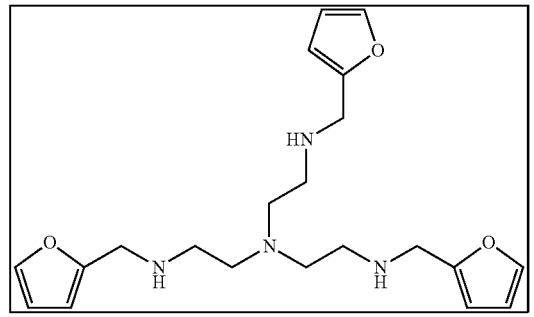 [SMILES: c1coc(CNCCN(CCNCc2ccco2)CCNCc2ccco2)c1] |

TABLE 5-continued
Examples of suitable Binder Components.
| [1446921-77-2] furfuryl (tri-) | 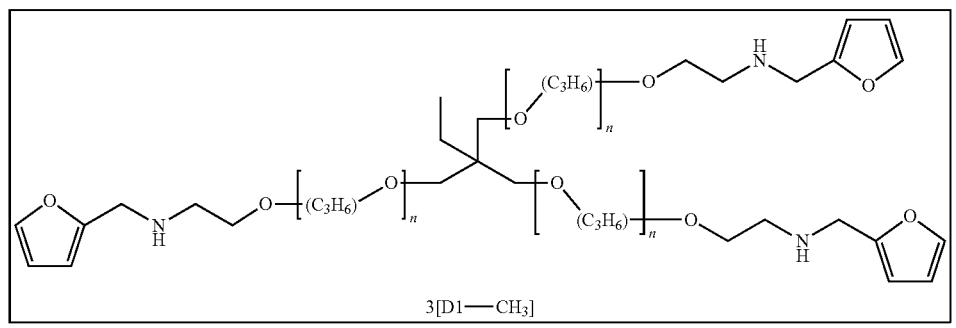 |
| [CAS] | Diels-Alder Part B: "Dieneophile" Candidate Structures |
|---|---|
| 1327278-55-6 Type: maleimide (tetra-) | 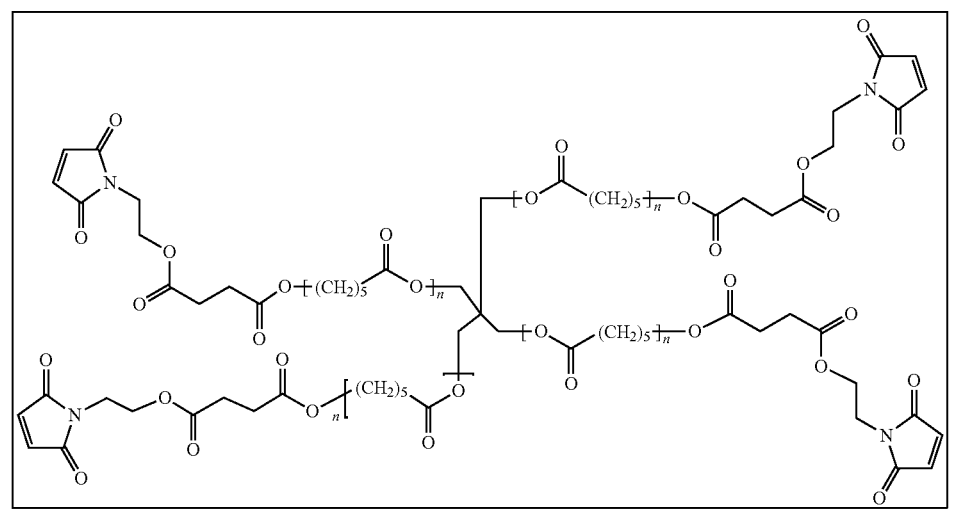 |
| 13676-54-5 Type: maleimide (di-) | 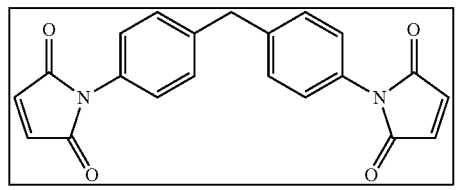 [SMILES: O=C1C=CC(=O)N1c1ccc(Cc2ccc(N3C(=O)C=CC3=O)cc2)cc1] |
| 200621-51-8 Type: maleimide (di-) | 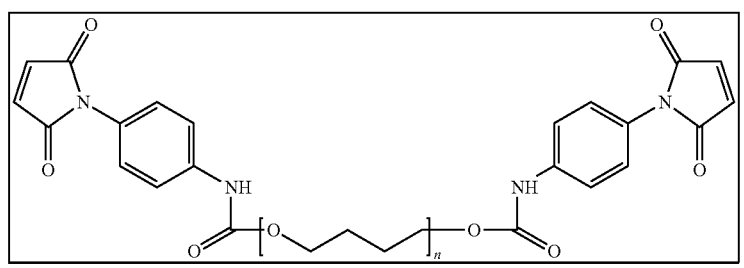 |
| 13595-10-3; or Linking Group Type: maleimide | 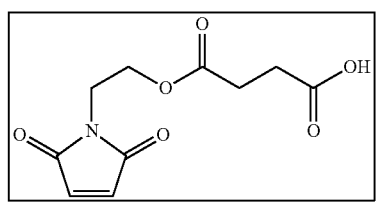 [SMILES: O=C(O)CCC(=O)OCCN1C(=O)C=CC1=O] |

TABLE 5-continued
Examples of suitable Binder Components.
| | |
|---|---|
| 941-69-5; or Linking Group Type: maleimide (phenyl-) | 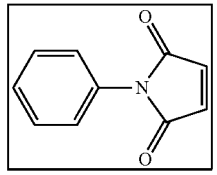 [SMILES: O=C1C=CC(=O)N1c1ccccc1] |
| [5426-09-5] Furan-Maleic Anhydride DA Adduct. | 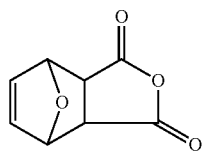 [SMILES: O=C1OC(=O)C2C3C=CC(O3)C12] |
| 959773-21-8; furan-maleimide functional | 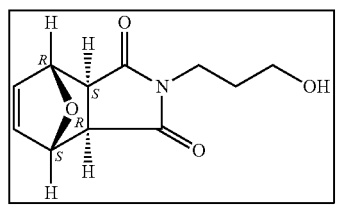 |
| 1032997-14-0 furan-maleimide functional | 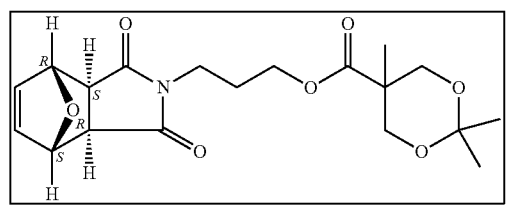 |
| Stage 2: [1032997-15-1] furan-maleimide functional | 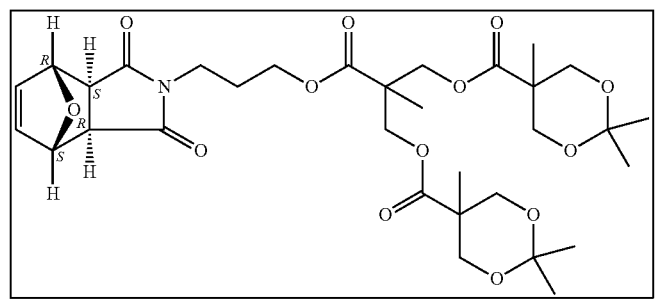 |
| Stage 3: [1032997-17-3] furan-maleimide functional | 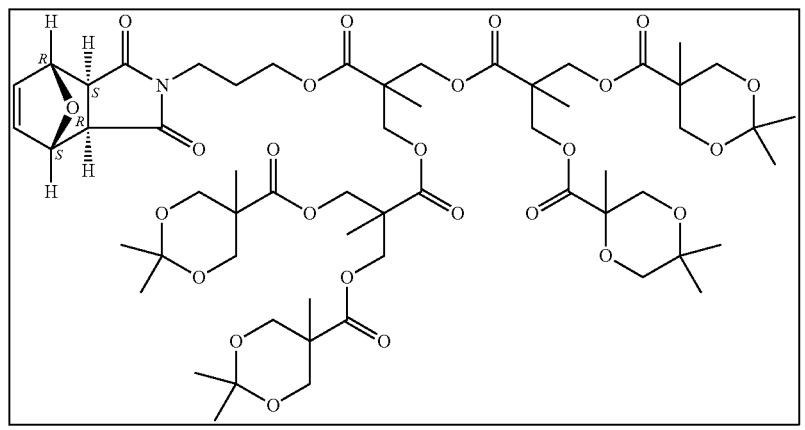 |

TABLE 5-continued
Examples of suitable Binder Components.
| | |
|---|---|
| Stage 1: maleimide: [1032997-27-5] | 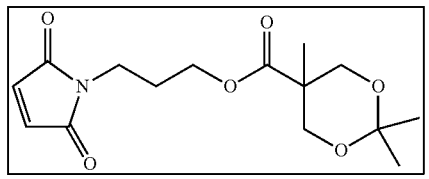 [SMILES: CC1(C)OCC(C)(C(=O)OCCCN2C(=O)C=CC2=O)CO1] |
| Stage 2 maleimide: [1032997-28-6] | 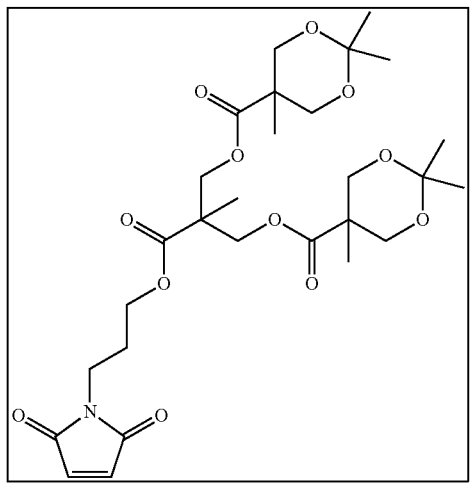 [SMILES: CC1(C)OCC(C)(C(=O)OCC(C)(COC(=O)C2(C)COC(C)(C)OC2)C(=O)OCCCN2C(=O)C=CC2=O)CO1] |
| Stage 3 maleimide: [1032997-29-7] | 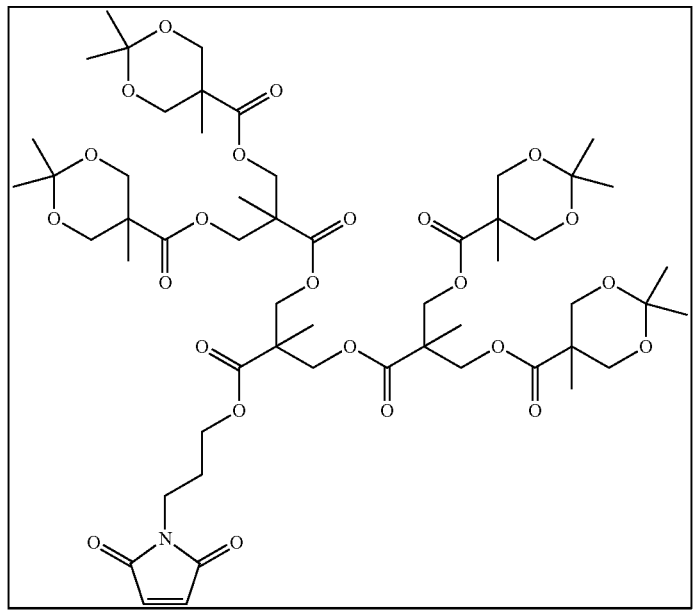 |
| [4856-87-5] maleimide | 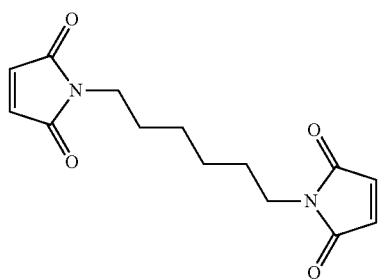 [SMILES: O=C1C=CC(=O)N1CCCCCCN1C(=O)C=CC1=O] |

TABLE 5-continued

Examples of suitable Binder Components.

[139112-38-2] maleimide

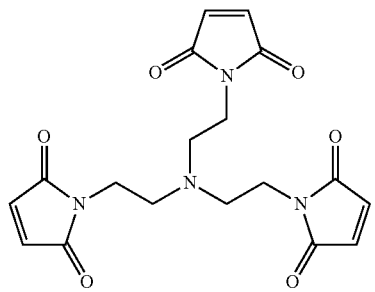 [SMILES: O=C1C=CC(=O)N1CCN(CCN1C(=O)C=CC1=O)CCN1C(=O)C=CC1=O]

EXAMPLES

Example 1

Preparation of Diene-Functional Resin Binder Component (DER 663U-Furfuryl Amine) DER 663UFA Representative diene-functional resin binder component (DER 663U-FA) was prepared using the following procedure. DER 663U is a solid bisphenol A based epoxy available from Dow. Furfurylamine (FA) is a renewable resource based chemical available from Penn-A-Kem LLC (Memphis, Tenn.). Into a pair of suitable containers (e.g. 550 mL Thinky® mixer cup (HDPE)) were each placed: 132 parts DER 663U (solid) and 18.1 parts FA (liquid). Next, the containers were placed in a ~114° C. oven for ~60 minutes to soften, melt the mixture. Then, the pair of containers were mixed at ~1400 rpm for ~30 seconds using a Thinky® ARV-930T (twin container) centrifugal planetary mixer. Next, the containers were removed from the mixer and a metal spatula was used to scrape the material from the interior walls to the center of the mixing cup and the containers returned to the 114° C. oven for at least 10 minutes to ~60 minutes depending on the number of containers being processed. Then, the pair of containers was returned to the Thinky® ARV-930T machine and mixed for a second and final cycle of ~30 seconds at ~1400 rpm. Finally, the containers were removed from the mixer and the reaction product of the amine-functional furfuryl compound and the epoxy-functional DER 663U was transferred to a large aluminum pan in a hood to cool to room temperature. It should be understood that the reaction of these components is quite facile and the reaction is complete even at lower temperatures (as determined by FTIR and NMR). The elevated temperature was found to be a convenient one-step production in line with the same process parameters utilized for coating of proppant beads with the final reaction product. A convenient method to reduce the product to a fine powder for resulting coating operations was to introduce a controlled amount of liquid nitrogen to a batch of product, crush, and sieve to the desired particle size.

Example 2

Preparation of Binder Resin Coated Proppant (RCP) (Part A)

Representative diene-functional resin binder component (DER 663U-FA) (1) coated proppant (Part A) was prepared using the following procedure. DER 663U-FA is a solid furfuryl functional bisphenol A based binder component prepared in Example 1. Into a pair of suitable containers (e.g. 550 mL Thinky® mixer cup (HDPE)) were each placed: 200 parts of suitable proppant (e.g. CarboLite® 16/20 (Carbo Inc), Carboprop HSP® 20/40 (Carbo Inc), Ottawa sand etc.) and the corresponding amount of (1) to achieve the target loading. For example, to prepare a nominal 4 pph (3.85 wt. %) loading 8 grams of (1) were added to 200 grams of proppant. Next, the containers were placed in a ~114° C. oven for ~60 minutes to soften, melt the mixture. Then, the pair of containers were mixed at ~1400 rpm for ~30 seconds using a Thinky® ARV-930T (twin container) centrifugal planetary mixer. Next, the containers were removed from the mixer and a metal spatula was used to scrape the material from the interior walls to the center of the mixing cup and the containers returned to the 114° C. oven for a period of at least 10 minutes to about 60 minutes depending on the number of containers being processed. Then, the pair of containers was returned to the Thinky® ARV-930T machine and mixed for a second and final cycle of ~30 seconds at ~1400 rpm. Finally, the containers were removed from the mixer and the resin-coated proppant (Part A) was transferred to a large aluminum pan in a hood to cool to room temperature. A convenient method to reduce the product to a fine powder for resulting coating operations was to introduce a controlled amount of liquid nitrogen to a batch of product, crush, and sieve to the desired particle size.

Example 3

Preparation of Binder Resin Coated Proppant (RCP) (Part B)

Representative dieneophile-functional resin binder component coated proppant (Part B) was prepared using the following procedure. There are a number of suitable dieneophile binder components that can be utilized. A preferred embodiment is to use a maleimide-functional polymer such as BMI-3000 ® (2), a solid powder bismaleimide available from Designer Molecules Incorporated. Into a pair of suitable containers (e.g. 550 mL Thinky® mixer cup (HDPE)) were each placed: 200 parts of suitable proppant (e.g. CarboLite® 16/20 (Carbo Inc), Carboprop HSP® 20/40 (Carbo Inc), Ottawa sand etc.) and the corresponding amount of (2) to achieve the target loading. For example, to prepare a nominal 4 pph (3.85 wt. %) loading 8 grams of (2) were added to 200 grams of proppant. Next, the containers were placed in a ~114° C. oven for ~60 minutes to soften, melt the mixture. Then, the pair of containers were mixed at ~1400 rpm for ~30 seconds using a Thinky® ARV-930T (twin container) centrifugal planetary mixer. Next, the containers were removed from the mixer, a metal spatula was used to scrape the material from the interior walls to the center of the mixing cup, and the containers returned to the 114° C. oven for a period of time of at least 10 minutes to about 60 minutes depending on the number of containers being processed. Then, the pair of containers was returned to the Thinky® ARV-930T machine and mixed for a second and final cycle of ~30 seconds at ~1400 rpm. Finally, the containers were removed from the mixer and the resin-coated proppant (Part B) was transferred to a large aluminum pan in a hood to cool to room temperature. A convenient method to reduce the product to a fine powder for resulting coating operations was to introduce a controlled amount of liquid nitrogen to a batch of product, crush, and sieve to the desired particle size.

Example 4

Preparation of Linear Gel Carrier Fluid

In order to simulate the delivery method to be used in the final application, the binder resin coated proppant particles of this invention (Example 2 or 3) were dispersed separately in a high viscosity carrier fluid (e.g. hydroxyethyl cellulose (HEC), or crosslinked guar, respectively). For the linear gel (HEC) carrier either powder or polymer suspensions can be utilized. For a preferred embodiment of this invention, an HEC concentrate (40% solids suspension in mineral oil) from Drilling Specialties (www.cpchem.com) was used. First, 1000 parts water was added to a suitable container and acidified to between pH 4-5 with a 50:50 mixture of acetic acid in water (~0.15 parts) to facilitate the subsequent dispersion, and prevent clumping by too rapid hydration of the HEC. Next, an 80 pounds per thousand gallon (80 pptg=~24 mL/L $H_2O$) carrier fluid slurry was prepared by adding 24 parts by volume (pbv) of the HEC mineral oil concentrate under vigorous stirring for about one minute. Once the HEC polymer was fully hydrated, the pH of the mixture was basified to pH ~9 by adding ~2.1 pbv of 0.25M potassium hydroxide (KOH) to facilitate dispersion with the vigorous stirring continued for several minutes. Then, the final pH of the slurry was adjusted back to neutral (~pH=7) through the addition of a small amount of 50:50 mixture of acetic acid in water (~0.05 parts).

Figure 5:
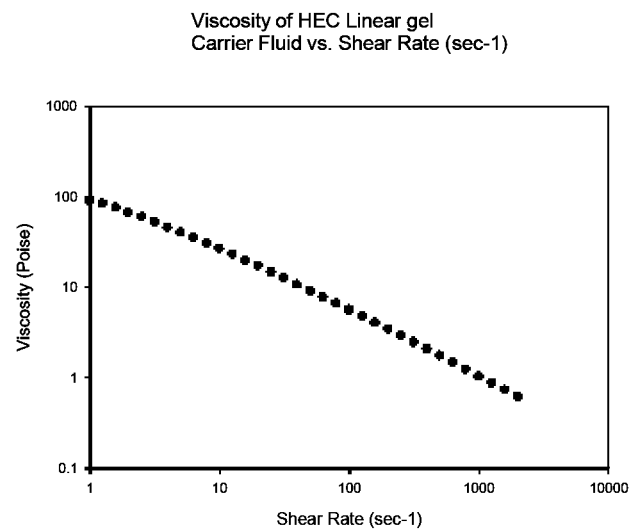
FIG. 5 shows a rheological characterization of HEC carrier fluid.

To check the quality of the HEC dispersion an aliquot was tested using a Fann 35B viscometer at ~300 rpm (~511 sec$^{-1}$ shear rate) with a target value of ~180 cps or more. In addition, a viscosity vs increasing shear rate measurement of the gel was conducted using a TA computer controlled rheometer in parallel plate mode (results shown in FIG. 5).

Example 5

Preparation of Crosslinked Guar Gel Carrier Fluid

Figure 6:
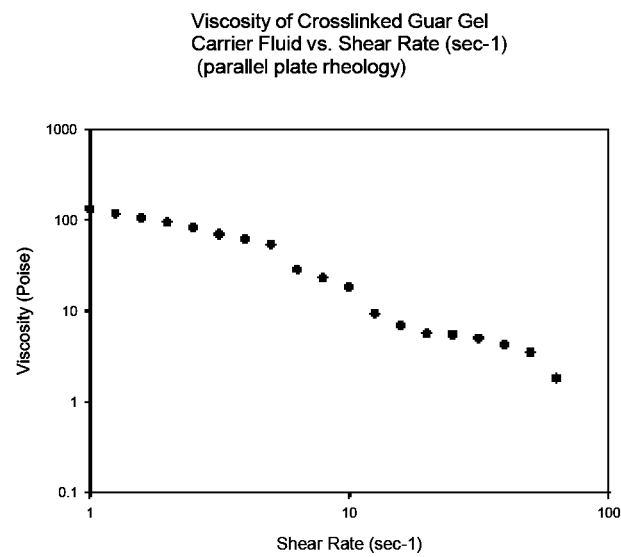
FIG. 6 shows a rheological characterization of crosslinked guar carrier fluid.

For the crosslinked Guar gel carrier either powder or polymer suspensions can be utilized. For a preferred embodiment of this invention, a guar concentrate (80 # (pptg) Seaquest®) from Halliburton Inc. suspension in mineral oil was used. First, a ~30# (pptg) carrier fluid mixture was prepared by adding ~385 parts Seaquest® to ~615 parts tap water in a suitable container with stirring. The mixture was then mixed at ~1200 rpm for ~8 minutes to disperse the guar suspension. Next 802 parts of the guar dispersion was placed in a suitable container and the pH was adjusted to 9.5-10 while stirring in 12.0 parts Vicon NF. Then, a small amount (0.2 parts Cat-OS-1) of catalyst was added with continued stirring at ~500-1000 rpm. Next the first crosslinking agents 4.81 parts CL-38 was added while mixing, being careful to minimize air-entrapment by varying the speed between 1000 and 500 rpm. Then 0.8 parts of the second faster crosslinking agent (CL-31) was added and the mixture stirred at ~850 rpm for several minutes until the maximum viscosity crosslinked gel formed, whereupon the stir speed was decreased to ~500 rpm. The pH of the slurry was again checked and confirmed to be pH ~9.5. To check the quality of the crosslinked guar dispersion, an aliquot was tested using a Fann 35B viscometer at ~300 rpm (~511 sec$^{-1}$ shear rate) with a target value of ~180 cps or more. In addition, a viscosity vs increasing shear rate measurement of the gel was conducted using a TA computer controlled rheometer in parallel plate mode (results shown in FIG. 6).

Example 6

Preparation and Loading of Proppant Slurry into Curing Cells

For a typical experimental test cell, into a stainless steel beaker, was added ~144 parts of resin coated proppant beads (72 pbw of Part A and 72 pbw of Part B) and premixed by hand with a spatula for ~1 minute to help randomize the two components. Then, in a separate stainless steel beaker was placed either 75 parts of linear gel (HEC, example 4) or crosslinked guar gel carrier fluid (example 5), respectively, and overhead stirring begun at ~500 rpm. Next, the resin-coated proppant was slowly added to the carrier fluid with continued stirring. After the proppant has been completely added, the proppant carrier fluid slurry was mixed an additional few minutes at 500 rpm.

The proppant carrier slurry mixture was then transferred into a set of ~1" diameter stainless steel cylindrical cure test cells (see FIG. 13) leaving ~0.5" of space available at the top. Then the remaining headspace in the cell was filled with 2% KCl (brine). Next, to simulated pumping of the slurry, a ported piston was inserted, textured side down, in the top of each loaded cell and a pushed ~2.3" vertically down into the cylinder with a small press, allowing some of the fluid (~25 mL) to escape through the bottom. Then, additional brine (2% KCl) was added to completely fill the top of each cell and the cell top was assembled and sealed.

For (worst-case) samples that were to be cured in the presence of the viscosified carrier fluid, the test cell was placed in an oven in the vertical position and cured under the appropriate conditions.

For samples that were to be flushed with brine according to the desired downhole FnP scenario an addition processing step was used. The assembled test cell manifold valves were connected to a pump and the carrier was flushed from the cell until ~100 mL of effluent was collected from the bottom. After the cell flushing was complete, the test cell was again topped off with 2% KCl, reassembled with the cap, and sealed.

To prepare corresponding samples for hydraulic stability and permeability a flow-through test cell (FTC) was loaded with the same slurry as above and cured.

Example 7

Curing of Binder Resin Coated Proppant

In a typical experiment, a set of test cells were placed in vertical holding rig and loaded into large ovens and cured under a matrix of cure profiles designed to represent a range of potential down-hole temperatures, including several scenarios of the warm-up time period between the completion of proppant delivery and the return of the formation to equilibrium temperature range in the absence of any water injection flow.

Batches of FMDA proppant beads were coated with furan (A) and maleimide (B) components for time-temperature curing and unconfined compressive strength (UCS) properties at Battelle. For example, sample cells cured for 3 days @ 160° F. and @ 200° F. We have evaluated the formulation a using a slow Ramp to 160 F and 200 F over 3 days, and Fast Ramp to 160° F. and 200 F over one day. In addition, samples were cured in both cases of flushing the gel with 2% KCl brine and with leaving the HEC or crosslinked gel in the cell.

The matrix of cure test protocols is shown in Table 6 below.

TABLE 6

Test protocol for evaluation of Battelle proppant samples

| No Flush | 2% KCl Brine Flush |
|---|---|
| 160° F. Slow (72 hr Ramp) | 160° F. Slow (72 hr Ramp) |
| 160° F. Fast (24 hr Ramp) | 160° F. Fast (24 hr Ramp) |
| 160° F. Constant | 160° F. Constant |
| 200° F. Slow (72 hr Ramp) | 200° F. Slow (72 hr Ramp) |
| 200° F. Fast (24 hr Ramp) | 200° F. Fast (24 hr Ramp) |
| 200° F. Constant | 200° F. Constant |

Representative test results for unconfined compressive strength (UCS) are presented in Table 7, Table 8, Table 9, and Table 10 for systems delivered in HEC, crosslinked Guar, with and without flushing with brine.

The results of the UCS and FTC test for a wide variety of formulations with 3% to 5% loading of the binder components on the proppant beads is tabulated in a number of Tables which follow.

Test Results (unconfined compressive strength) of proppant pack (target >~100 psi)

TABLE 7

UCS test results for 5% FM1 proppant loading

| 5% FM1 | Unconfined Compressive Strength (psi) | | | | | | | | |
|---|---|---|---|---|---|---|---|---|---|
| Binder | Flushed HEC | | | Flushed Guar | | | Non-Flushed Guar | | |
| Days | 1 | 2 | 3 | 1 | 2 | 3 | 1 | 2 | 3 |
| 160 F. | 121 | 283 | 328 | 154 | 153 | 145 | 120 | 164 | 154 |
| 200 F. | 327 | 465 | 323 | 393 | 398 | 412 | 367 | 416 | 403 |
| SR 160 | 2 | 4 | 51 | <2 | <2 | <2 | <2 | <2 | <2 |
| FR 200 | — | — | — | 98 | 163 | 179 | 92 | 131 | 315 |

TABLE 8

UCS test results for 3% FM1 proppant loading in HEC: Brine flushed vs non flushed

| 3% FM1 | Unconfined Compressive Strength (psi) | | | | | |
|---|---|---|---|---|---|---|
| Binder | Flushed HEC | | | Non Flushed HEC | | |
| Days | 1 | 2 | 3 | 1 | 2 | 3 |
| 160 F. | 81 | 142 | 226 | 93 | 187 | 229 |
| 200 F. | 135 | 240 | 213 | 155 | 267 | 189 |

TABLE 9

UCS test results for 3% FM1 proppant loading in Guar: Brine flushed vs non flushed

| 3% FM1 | Unconfined Compressive Strength (psi) | | | | | |
|---|---|---|---|---|---|---|
| Binder | Flushed Guar | | | Non-Flushed Guar | | |
| Days | 1 | 2 | 3 | 1 | 2 | 3 |
| 160 F. | 8 | 19 | 44 | 45 | 47 | 52 |
| 200 F. | 262 | 235 | 199 | 169 | 233 | 163 |
| SR 160 | <2 | <2 | <2 | <2 | <2 | <2 |
| FR 160 | 2 | — | — | 4 | — | — |
| SR 200 | 4 | 4 | 56 | <2 | 45 | 69 |
| FR 200 | 65 | — | — | 57 | — | — |

TABLE 10

UCS test results for 3% FM1 proppant loading in HEC: Brine Flushed guar vs Brine flushed HEC

| 3% FM1 | Unconfined Compressive Strength (psi) | | | | | |
|---|---|---|---|---|---|---|
| Binder | Flushed HEC | | | Flushed Guar | | |
| Days | 1 | 2 | 3 | 1 | 2 | 3 |
| 160 F. | 81 | 142 | 226 | 8 | 19 | 44 |
| 200 F. | 135 | 240 | 213 | 262 | 235 | 199 |
| SR 160 | <2 | 10 | 21 | <2 | <2 | <2 |
| FR 160 | 21 | — | — | 2 | — | — |
| SR 200 | 15 | 144 | 154 | 4 | 4 | 56 |
| FR 200 | 143 | — | — | 65 | — | — |

Figure 7:
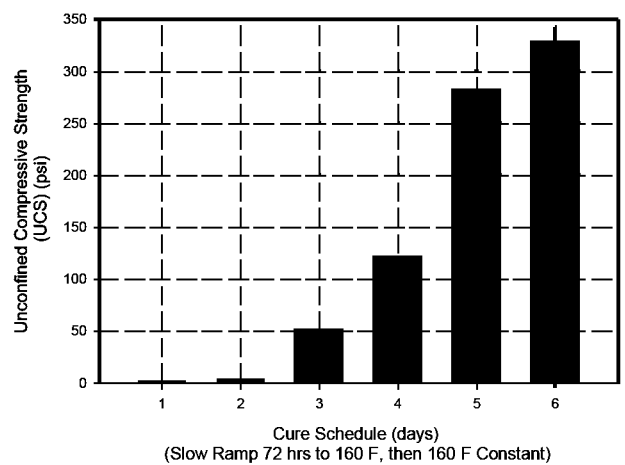
FIG. 7 shows the latent cure properties of the FM1 resin coated proppant binder system.

The latent cure properties of the FM1 resin coated proppant binder system is shown in FIG. 7.

Hydraulic stability and permeability (FTC) test results at the equivalent of 300 gallon per minute through an 8-inch casing are shown in Table 11.

TABLE 11

FTC test results for 3% FM1 proppant loading with UCS results

| | 3% FM1; Cured 3 days @ 160 F. | | | 5% FM1; Cured 3 days @ 160 F. (Flushed HEC) |
|---|---|---|---|---|
| | Flushed Guar | Non-Flushed Guar | Flushed HEC | |
| UCS (psi) | 44 | 52 | 226 | 328 |
| FTC backpressure @ 20 gal./min | 24 | 66 | 33 | |

TABLE 11-continued

FTC test results for 3% FM1 proppant loading with UCS results

| 3% FM1; Cured 3 days @ 200 F. | Flushed Guar | Non-Flushed Guar | Flushed HEC | 5% FM1; Cured 3 days @ 200 F. (Flushed HEC) |
|---|---|---|---|---|
| UCS (psi) | 199 | 163 | 213 | 323 |
| FTC backpressure @ 20 gal./min | 26 | 43 | 31 | 52 |

Figure 8:
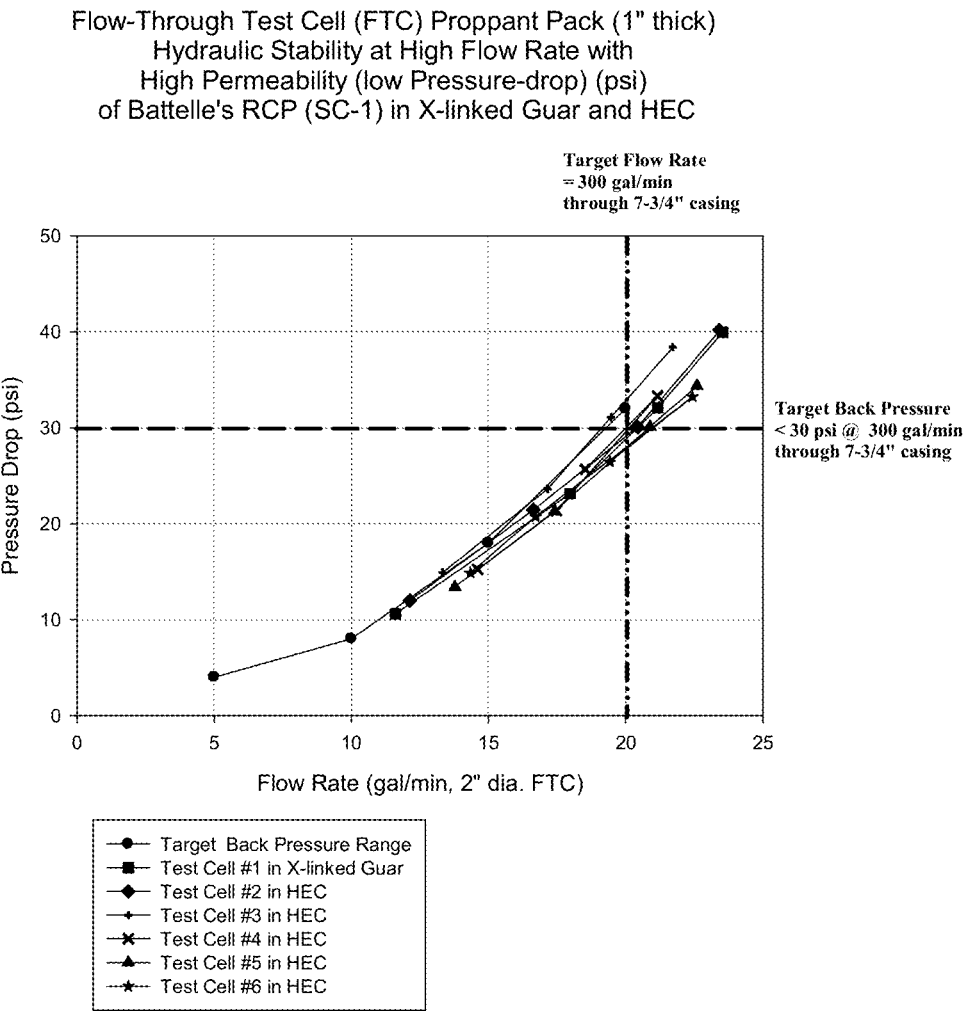
FIG. 8 shows FTC hydraulic stability and pressure drop vs flow rate (2" dia.pipe)
Figure 9:
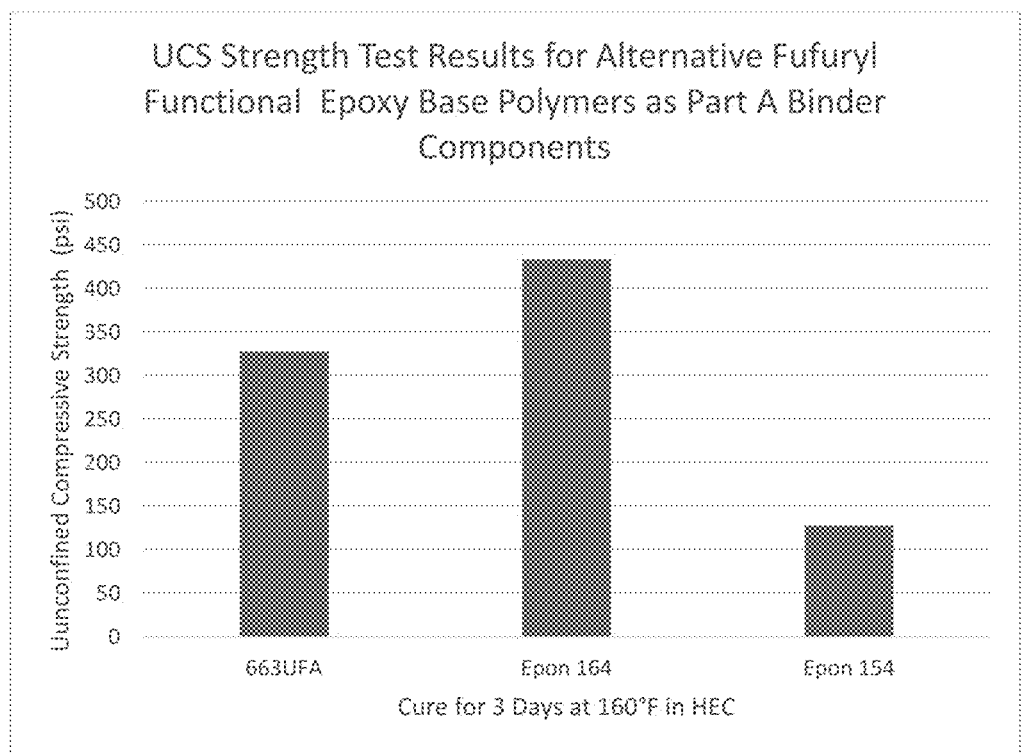
FIG. 9 shows UCS Test Results for an example of furfuryl-modified epoxy components.

The appropriate binder thickness for UCS strength and hydraulic stability is balanced with high permeability i.e., low-pressure drop across proppant pack as illustrated in FIG. 8.

Example 8

Alternative Part a Component RCP Binder Formulation Test Results

TABLE 12

UCS Test Results for Alternative Part A Components

| System: After 3 Day cure at 160 F. in HEC | UCS Strength |
|---|---|
| 663UFA (FIG. 5 + FIG. 6) | 328 |
| Epon 164 (FIG. 8 + FIG. 6) | 434 |
| Epon 154 (FIG. 7 + FIG. 6) | 128 |

Example 9

Multi-Component Layered FM1 System

In this embodiment, multi-layered resin coated proppant beads were produced, wherein one component comprised the first discrete layer and the second component was coated on top of the first component. In this way, a simpler to handle, single product bead could be provided with the bonding between proppant beads forming an A-B-B-A structure or a B-A-A-B structure when final cure was obtained.

First, the coating properties of each component were determined at moderately low temperature, some below the melt temperature of each component. This was made possible by the high particle-to-particle shear delivered by the centrifugal-planetary mixing method. It was found that the formulation of Example 2 (Part A) could be coated on proppant e.g. Carbolite® 16/20 at 60-65° C. using the standard 30 sec at 1400 rpm mixing protocol producing a uniform coating as observed using a microscope. Alternatively, the formulation of Example 3 (Part B) was less amenable to such low temperature coating producing a rather chunky surface under the same conditions. To improve the low temperature coating properties of the Part B material, it was mixed with 1 pph, 2 pph, 3 pph, 5 pph, and 10 pph mineral oil or soy-wax, respectively. It was found that incorporating ~3-pph mineral oil or ~5-pph soy-wax resulted in a uniform coating layer on the Part B proppant beads. pph (part per hundred resin added) In addition, based on the different coating properties of the single components, an attempt was made to form a two-phase mixture (blend) of the two components by combining the neat resin components together in powder form, heating them to 60-65° C. and mixing them together at high shear. It was found that they did not form a good blend at these temperatures, and had a chunky appearance.

To determine the properties of the multi-layer system: one embodiment was prepared by first coating Carbolite 16/20 with 2.5 wt. % Part A (Example 2) using the standard method.

Next, samples of this coated proppant were coated at 60-65° C. with 2.5 wt. % Part B that had been blended with 3 pph mineral oil, or 5 pph soy-wax, respectively. The multilayer coated proppant beads were then processed as before, with breaking of agglomerates, sieving off fines, rinsing in 2% KCl brine, then water, and drying at ambient temperature. Samples of the multilayer coated proppant beads were then mixed into HEC carrier fluid as in Example 5, and loaded into curing cells as in Example 6, loaded into cells as in Example 7, in this case flushed with brine and cured for 3 days at 93° C. (200° F.). The samples were then tested for UCS strength and with the 3 pph Mineral Oil blend outer layer and 5 pph was blend outer layer formulations yielding 767 psi, and 973 psi respectively, the highest strength achieved for the 5% total resin systems. An attempt to switch the order of these two components resulted in resin-coated beads that were clumpy in appearance and were not tested.

Example 10

Preparation and Rheology of Reaction Product of Part A and Part B (FM1)

To study the rheological properties of the Diels-Alder binder components and the reaction product, Part A (DER663U-FA) and Part B (BMI-3000) were reacted in stoichiometric ratio and "cured" with intermediate mixing stages overnight@ ~113 C. After cooling, the product is a tough hard polymer (although not crosslinked, since both are bifunctional reactants).

Figure 10:
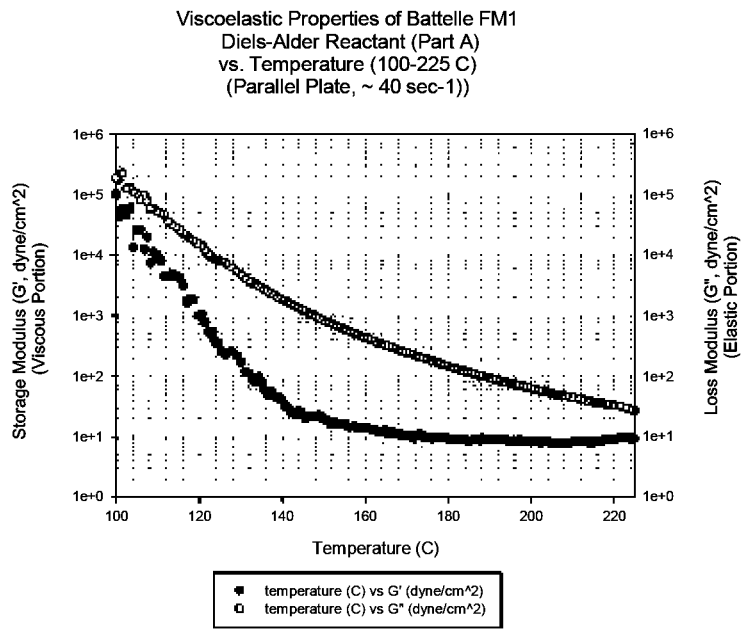
FIG. 10 shows the rheological properties of FM1 Part A Component from Example 10.
Figure 11:
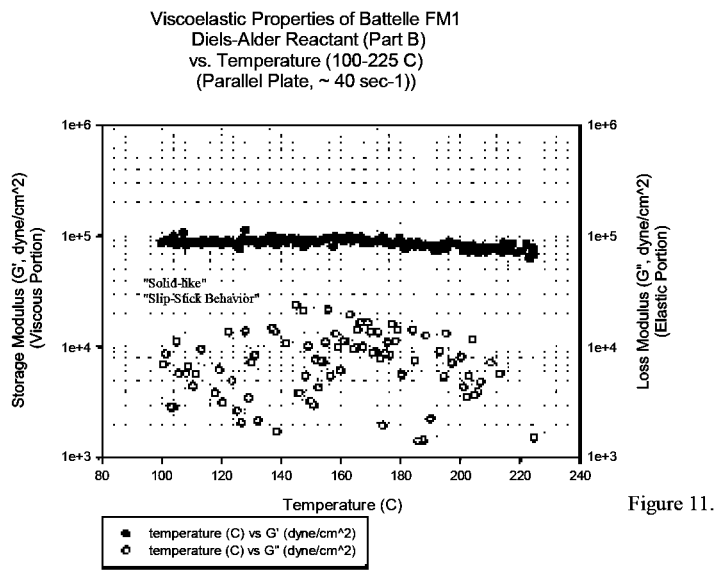
FIG. 11 shows the rheological properties of FM1 Part B Component from Example 10.
Figure 12:
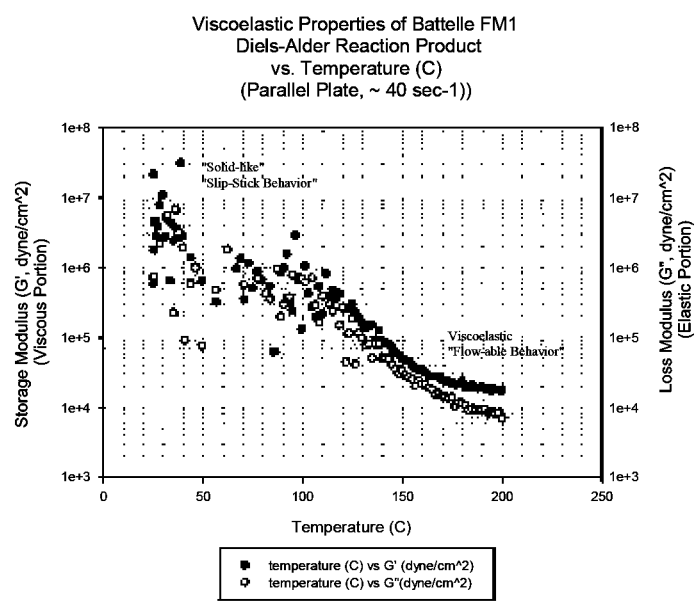
FIG. 12 shows the rheological properties of FM1 Diels Alder Binder Reaction Product from Example 10.
Figure 13:
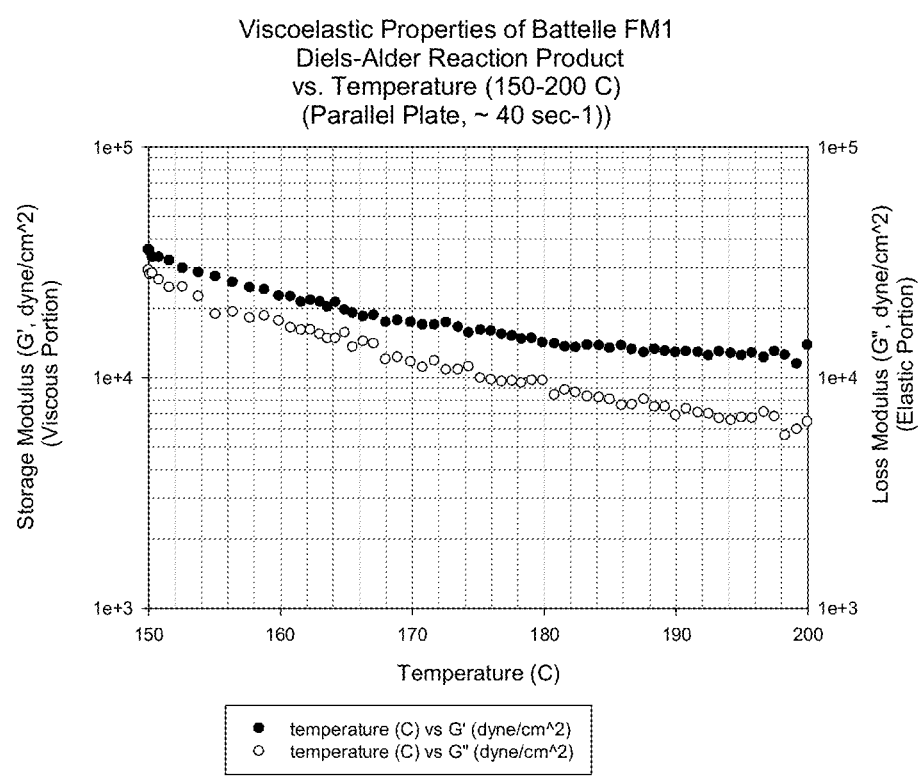
FIG. 13 shows the rheological properties of FM1 in Viscoelastic region from Example 10.

The rheological properties of the individual reactant solid components and the final product solid were determined using a TA computer controlled rheometer. The results for the individual binder components are presented in FIG. 10 and FIG. 11. The results for the product are shown in FIG. 12 and FIG. 13. For the solid product, this was from ~225° C. where it is semi-melted back down ~100° C. There is a transition to "solid" viscoelastic behavior @ ~150° C. or so. However, there still is a large elastic component (G") along with the viscous (liquid) component (G'). It appears that any "retro-DA" does not begin until >150° C. (300 F) and is not really effective until at least >225° C. (437 F) which is well above the temperature of down-hole environments especially for liquid (aqueous soluble) monomer mixtures. Attempts to coat the proppant particles with a mixture of Part A and Part B at temperatures up to ~114 C were unsuccessful. In addition, subsequent attempts to coat the proppant particles with the full reaction product of Part A and Part B at temperatures up to ~200 C were also completely unsuccessful.

Example 11

Utility of Resin Binder Coated Proppants in Other Soil Consolidation Applications There is also a need to improve the stability of soil formations, such as when subsidence, sinkholes or other geologic formation problems exist. The products of this invention may be successfully used as substitutes for concrete piers and pillars currently employed in this application. The present invention may provide with both lighter weight and the ability to control the hydraulic stability to be more or less porous base on control of the binder thickness and the range of particle size blends used in particular support elements. The reaction temperature regime and cure kinetics may be controlled by catalysts and desired latency period.

For the purposes of this invention, the fraction of the Diene-linker to the overall part A binder component preferably ranges from about five (5) to about sixty (60) mass percent of that component. More preferably, it can range from 5-50%, 10-45%, or 15-30%. This is illustrated for the case of furfuryl and anthracene diene-linkers in the Table 13.

TABLE 13

Fractional Diene Linker Content of Part A Binder Compositions

| Diels-Alder Part A Diene [CAS] | Binder Component A Mw | Diene-Linker | Linker Mw | wt. % Linker in Binder Component Part A |
|---|---|---|---|---|
| [1327278-54-5] | 1313.2 |  furan [110-00-9]; furfuryl; 68.1 Mw | 272.4 | 20.7 |
| [1357144-48-9] | 678.7 | 110-00-9; furfuryl | 136.2 | 20.1 |
| [61190-77-0] | 306.3 | 110-00-9; furfuryl | 136.2 | 44.5 |
| [135726-87-3] | 386.5 | 110-00-9; furfuryl | 204.3 | 52.9 |
| [1446921-77-2] | 852.1 | 110-00-9; furfuryl | 204.3 | 24.0 |
| [1032997-24-2] | 838.9 | 110-00-9; furfuryl | 68.1 | 8.1 |
| [1032997-20-8] | 414.4 | 110-00-9; furfuryl | 68.1 | 16.4 |
| FM1 FA Adduct of DER 663U BPA (FIG. 3.) (preferred formulation) | 1672 | 110-00-9; furfuryl | 136.2 | 8.1 |
| FA Adduct of Epon 154 Novolak (see FIG. 3?) | 1025.2 | 110-00-9; furfuryl; | 272.4 | 26.6 |
| FA Adduct of Epon 164 Cresol (see FIG. 4) | 1081.3 | 110-00-9; furfuryl | 272.4 | 25.2 |
| [1357144-49.0] | 1754.0 | 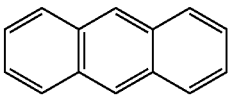 [SMILES: c1ccc2cc3ccccc3cc2c1] anthracene [120-12-7]; 178.2 Mw | 713.6 | 40.7 |

For the purposes of this invention, the fraction of the Dieneophile-linker to the overall part B binder component can range from about five (5) to about eighty (80) mass percent of that component. More preferably, it can range from 10-70%, 15-60%, 20-50%. This is illustrated for the case of a maleimide dieneophile-linker in the Table 14.

TABLE 14

Fractional Dieneophile Linker Content of Part B Binder Compositions

| Diels-Alder Part B Diene-ophile | Binder Component B Mw | Dieneophile Linker | Linker Content Mw | wt. % Linker in Binder Component Part B |
|---|---|---|---|---|
| [13676-54-5] | 358.3 |  (1-H-pyrrole-2,5-dione) [541-59-3]maleimide 97.1 Mw | 194.2 | 54.2 |
| [1327278-55-6] | 1485.4 | 541-59-3; maleimide | 358.4 | 24.1 |
| [200621-51-8] | 518.5 | 541-59-3; maleimide | 194.2 | 37.5 |
| [4856-87-5] | 276.3 | 541-59-3; maleimide | 194.2 | 70.3 |
| [139112-38-2] | 386.4 | 541-59-3; maleimide | 291.3 | 75.4 |
| [3006-93-7] | 268.2 | 541-59-3; maleimide | 194.2 | 72.4 |
| FM1 Component B, Preferred Formulation (BMI-3000 Bismaleimide) | 2846.3 | 541-59-3; maleimide | 194.2 | 6.8 |

While various embodiments of the present invention have been described above, it should be understood that they have been presented by way of example only, and are not intended to limit the invention.

What is claimed:

1. A method of binding proppants in an underground formation, comprising:
    delivering a slurry comprising a first resin coated proppant and a second resin coated proppant through a wellbore;
    contacting the first resin coated proppant with the second resin coated proppant in the underground formation at a temperature sufficient to cause the resin coating on the first resin coated proppant to react with the resin coating on the second resin coated proppant in a Diels Alder reaction;
    wherein a reactive component in the resin coating on the first resin coated proppant consists essentially of one or more dienes and wherein a reactive component in the resin coating on the second resin coated proppant consists essentially of one or more dienophiles.

2. The method of claim 1 wherein the temperature is at least 160° F.

3. The method of claim 1 wherein the temperature is naturally occurring temperature in a downhole environment.

4. The method of claim 1 wherein the slurry comprises hydroxyethyl cellulose gel or crosslinked Guar gel.

5. The method of claim 1 wherein, prior to delivering the slurry through the wellbore, the first resin coated proppant comprises a water-soluble release coating.

6. The method of claim 1 wherein the mass ratio of the first resin coated proppant to the second resin coated proppant in the step of delivering is from 10:1 to 1:10.

7. The method of claim 1 wherein, prior to delivery in the slurry, and not including any release coating, the resin coating on the first resin coated proppant has a thickness in the range of 10 μm to 200μm.

8. The method of claim 1 wherein, prior to delivery in the slurry, and not including any release coating, the resin coating on the second resin coated proppant has a thickness in the range of 20 μm to 150 μm.

9. The method of claim 1 wherein the one or more dienes comprise a furfuryl moiety and the one or more dienophiles comprise a maleimide moiety.

10. The method of claim 1 wherein the temperature is from 180 to 230° F.

11. The method of claim 1 wherein, prior to delivery in the slurry, and not including any release coating, the resin coating on the first resin coated proppant has a thickness in the range of 20 μm to 150μm.

12. The method of claim 1 wherein, prior to delivery in the slurry, and not including any release coating, the resin coating on the first resin coated proppant has a thickness in the range of 50 μm to 120μm.

13. The method of claim 12 wherein, prior to delivery in the slurry, and not including any release coating, the resin coating on the second resin coated proppant has a thickness in the range of 50 μm to 120 μm.

14. The method of claim 13 wherein the one or more dienes comprise a furfuryl moiety and the one or more dienophiles comprise a maleimide moiety.

15. The method of claim 1 wherein the ratio of the first resin coated proppant to the second resin coated proppant in the step of delivering is within 10% of a 1:1 ratio, by number of particles.

16. The method of claim 1 wherein the one or more dienes are selected from the group consisting of:
- 1,3-butadiene; 1,3-pentadiene; 2,4-hexadiene; 1,3-cyclohexadiene; and their derivatives;
- furfuryl compounds and their derivatives;
- anthracene compounds and their derivatives;
- α-β-Unsaturated Carbonyl Compounds;
- pyrazole derivatives, imidazole derivatives, and quinoxalines.

17. The method of claim 1 wherein the one or more dienophiles are selected from the group consisting of:
- benzoxazole derivatives;
- maleic anhydride and maleimide derivatives;
- C-vinyllic, O-vinyllic, N-vinyllic compounds;
- —C≡N imino derivatives, —C|N cyanogen compounds, carbonyl and thiocarbonyl compounds, nitroso compounds, N-sulfinyl compounds, azo (—N═N—);
- dicarboxylate derivatives; and
- trivalent phosphorous compounds.

\* \* \* \* \*